(12) United States Patent
Quan et al.

(10) Patent No.: US 8,306,403 B2
(45) Date of Patent: Nov. 6, 2012

(54) CONTENT CONTROL VIA GUIDE DATA AND/OR METADATA

(75) Inventors: Ronald Quan, Cupertino, CA (US); John F. Cloutman, Tracy, CA (US)

(73) Assignee: Rovi Technologies Corporation, Santa Clara, CA (US)

( * ) Notice: Subject to any disclaimer, the term of this patent is extended or adjusted under 35 U.S.C. 154(b) by 306 days.

(21) Appl. No.: 12/749,225

(22) Filed: Mar. 29, 2010

(65) Prior Publication Data

US 2011/0235999 A1    Sep. 29, 2011

(51) Int. Cl.
*H04N 7/26* (2006.01)
*H04N 5/91* (2006.01)
*H04N 5/92* (2006.01)

(52) U.S. Cl. .................................. 386/326
(58) Field of Classification Search .................. None
See application file for complete search history.

(56) References Cited

U.S. PATENT DOCUMENTS

| | | |
|---|---|---|
| 4,577,216 A | 3/1986 | Ryan |
| 4,626,890 A | 12/1986 | Ryan |
| 4,631,603 A | 12/1986 | Ryan |
| 4,695,901 A | 9/1987 | Ryan |
| 4,819,098 A | 4/1989 | Ryan |
| 4,907,093 A | 3/1990 | Ryan |
| 4,914,694 A | 4/1990 | Leonard et al. |
| 4,937,679 A | 6/1990 | Ryan |
| 5,130,810 A | 7/1992 | Ryan |
| 5,157,510 A | 10/1992 | Quan et al. |
| 5,194,965 A | 3/1993 | Quan et al. |
| 5,315,448 A | 5/1994 | Ryan |
| 5,583,396 A | 12/1996 | Hideaki et al. |
| 5,784,523 A | 7/1998 | Quan et al. |
| 6,188,832 B1 | 2/2001 | Ryan |
| 6,222,978 B1 * | 4/2001 | Hirai .............................. 386/254 |
| 6,374,388 B1 | 4/2002 | Hinch |
| 6,381,747 B1 | 4/2002 | Wonfor et al. |
| 6,404,889 B1 | 6/2002 | Ryan et al. |
| 6,501,842 B2 | 12/2002 | Quan |
| 6,516,132 B1 | 2/2003 | Wrobleski et al. |
| 6,542,609 B1 | 4/2003 | Ryan et al. |
| 6,600,873 B1 | 7/2003 | Brill et al. |
| 6,836,549 B1 | 12/2004 | Quan et al. |
| 7,039,294 B2 | 5/2006 | Quan |

(Continued)

FOREIGN PATENT DOCUMENTS

GB    2 396 767 B    9/2004

(Continued)

OTHER PUBLICATIONS

U.S. Appl. No. 12/350,740, filed Jan. 1, 2009, Cloutman et al.

(Continued)

*Primary Examiner* — Thai Tran
*Assistant Examiner* — Sunghyoun Park
(74) *Attorney, Agent, or Firm* — Morrison & Foerster LLP

(57) ABSTRACT

Metadata of the type for instance associated with television or video Electronic Programming Guides (EPG) or Interactive Programming Guides (IPG), is transported via a digital delivery network such as the Internet to a video receiving device such as a personal video recorder (PVR). The receiving device extracts the metadata for a purpose such as determining from the metadata programming of control signals. The PVR thereby reads or interprets control signals derived from the metadata provided via the digital delivery network so as to control subsequent video recording.

26 Claims, 11 Drawing Sheets

U.S. PATENT DOCUMENTS

| | | | |
|---|---|---|---|
| 7,050,698 | B1 | 5/2006 | Quan |
| 7,236,683 | B2 | 6/2007 | Quan |
| 7,395,542 | B2 | 7/2008 | Muramatsu |
| 7,865,057 | B2 | 1/2011 | Hollar |
| 2003/0049016 | A1 | 3/2003 | Wrobleski et al. |
| 2003/0091335 | A1 | 5/2003 | Quan |
| 2004/0047469 | A1 | 3/2004 | Ryan et al. |
| 2004/0111740 | A1* | 6/2004 | Seok et al. ............. 725/31 |
| 2004/0228605 | A1 | 11/2004 | Quan et al. |
| 2005/0111661 | A1 | 5/2005 | Wijnen et al. |
| 2006/0083373 | A1 | 4/2006 | Ryan et al. |
| 2006/0085863 | A1 | 4/2006 | Ryan et al. |
| 2006/0093139 | A1 | 5/2006 | Quan |
| 2006/0093140 | A1 | 5/2006 | Quan |
| 2006/0093326 | A1 | 5/2006 | Tan et al. |
| 2006/0251252 | A1 | 11/2006 | Quan |
| 2007/0030968 | A1 | 2/2007 | Tan et al. |
| 2008/0276325 | A1 | 11/2008 | Quan |
| 2008/0309816 | A1 | 12/2008 | Quan et al. |
| 2009/0202215 | A1 | 8/2009 | Tan |

FOREIGN PATENT DOCUMENTS

| | | | |
|---|---|---|---|
| GB | 2 387 497 B | | 12/2004 |
| GB | 2 390 247 B | | 4/2006 |
| WO | WO-96/36174 A1 | | 11/1996 |
| WO | WO9965240 | * | 12/1999 |
| WO | WO-03/065716 A2 | | 8/2003 |
| WO | WO-03/065716 A3 | | 8/2003 |
| WO | WO-2004/004346 A1 | | 1/2004 |
| WO | WO-2004/110060 A1 | | 12/2004 |
| WO | WO-2005/039176 A1 | | 4/2005 |
| WO | WO-2005/039176 C1 | | 4/2005 |
| WO | WO-2006/050009 A1 | | 5/2006 |
| WO | WO-2007/000585 A2 | | 1/2007 |
| WO | WO-2007/000585 A3 | | 1/2007 |
| WO | WO-2011/034774 A1 | | 3/2011 |

OTHER PUBLICATIONS

U.S. Appl. No. 12/563,050, filed Sep. 18, 2009, Quan et al.
International Search Report mailed on Jul. 27, 2010, for PCT Application No. PCT/US2010/020532, filed on Jan. 8, 2010, three pages.
Written Opinion mailed on Jul. 27, 2010, for PCT Application No. PCT/US2010/020532, filed on Jan. 8, 2010, four pages.
International Search Report mailed on Mar. 1, 2011, for PCT Application No. PCT/US2010/048292, filed on Sep. 9, 2010, five pages.
Written Opinion mailed on Mar. 1, 2011, for PCT Application No. PCT/US2010/048292, filed on Sep. 9, 2010, five pages.
International Search Report mailed on Jul. 6, 2011, for PCT Application No. PCT/US2011/030377, filed on Mar. 29, 2011, four pages.
International Search Report mailed on Oct. 7, 2008 for International Application No. PCT/US2008/005708, filed on May 1, 2008, 2 pages.
Non-Final Office Action mailed on Jan. 5, 2012, for U.S. Appl. No. 12/150,901, filed Apr. 30, 2008, 17 pages.
Written Opinion mailed on Jul. 6, 2011, for PCT Application No. PCT/US2011/030377, filed on Mar. 29, 2011, eight pages.
U.S. Appl. No. 13/163,520, filed Jun. 17, 2011, Quan et al.

* cited by examiner

CONTENT CONTROL VIA GUIDE DATA AND/OR METADATA

FIELD

This disclosure pertains to digital video and video content control and television.

BACKGROUND

"Metadata" associated with video and television programming guides such as an Electronic Programming Guide (EPG) or an Interactive Program Guide (IPG) is transmitted via DTV (digital television) transmissions, IPTV (Internet Protocol Television), and/or a digital delivery network such as the Internet. The metadata may include information pertaining to video content (e.g., title), television tuning information (e.g., frequency, channels or sub channels), rating (e.g., parental control purposes such as locked out channels), closed caption data, and/or other data (e.g., control data for Video on Demand or Pay Per View).

Further relating to the field of video content control for the well known NTSC, PAL, and SECAM standard color television systems, color picture information is transmitted on a subcarrier signal. In this case of the NTSC system the sub-carrier signal has a frequency of about 3.58 MHz and in the case of the PAL system a frequency of about 4.43 MHz. In both systems the precise color at any point in the picture is determined by the phase of this subcarrier signal relative to some reference phase, while the degree of saturation of the color is determined by the amplitude of the subcarrier signal.

In order for a television receiver to correctly reproduce colors, the receiver requires information concerning the above-mentioned reference phase. This information is transmitted as part of the video signal in the form of a burst of about nine cycles of the subcarrier signal following the horizontal synchronizing pulse, and is referred to as the color burst. This color burst in the television receiver phase-locks a crystal oscillator circuit, thus generating a continuous subcarrier signal at the reference phase which is then used to demodulate the color information. It is normal for the phase-locked crystal oscillator circuit in the television receiver to have a fairly long time constant, on the order of a few milliseconds. The long time constant insures that the crystal oscillator circuit will ignore short term phase perturbations of the color burst signal as might be caused by noise. This color burst has been used for NTSC etc. standard television to provide copy protection, as described below.

SUMMARY

Information transported or transmitted in the form of metadata or a portion of EPG or IPG data as described above may be used to program, enable, or disable signals such as content control signals also as described above that are inserted or added to a video signal. One embodiment of the present invention utilizes such metadata and/or other information from EPG or IPG signals or similar sources to subsequently command a digital Personal Video Recorder (PVR) or provide (output) one or more types of video content control or record control signals. This metadata or EPG or IPG (or Electronic Service guide, ESG) signal may be transported by way of the Internet or other digital delivery network (e.g. cable, DSL, RF, satellite, fiber optic, phone lines, wireless, WiFi, WiMax, and/or the like). At least a portion of the metadata, EPG, and/or IPG signal is then coupled to a receiver. The receiver then extracts relevant data from the input signal to the receiver as metadata, EPG, or IPG information pertaining to control bits for enabling, disabling, and/or programming content control signal(s) or any combination of a content control signal and a copy protection signal. In an analog video signal, the metadata may be sent as pulses within one or more TV lines in an overscan area (e.g., pulses in one or more portion of a vertical and/or horizontal blanking interval, or portion of a TV line).

This disclosure further relates to commonly invented U.S. patent application Ser. No. 12/563,050 filed Sep. 18, 2009, hereby incorporated by reference in its entirety, and in particular to the well known Macrovision Corp. (now Rovi Corp.) "color stripe" (CS) process which is detected by specially provided signal detectors of the type often embedded in commercially available integrated chip sets used in video recorders or other Macrovision Corp. compliant video devices. It is known that such a color stripe detector is able to read or detect properly the Macrovision Corp. color stripe copy protection signals when an entire video color burst as described above is phase modified or when a majority of the color burst is so phase modified. In one embodiment of the invention there is provided a color stripe-type content control signal or record control signal that is detectable by a standard PVR while essentially not providing any chroma (color) copy protection signal, by providing a weakened color stripe different from the usual color stripe signal.

The usual color stripe signal, known from Ryan U.S. Pat. No. 4,577,216 incorporated herein by reference in its entirety, is primarily a copy protection video signal, which is generally playable on a TV (television) set, but which causes an analog recording video cassette recorder (VCR) to play back a recorded signal with color errors. In the PAL TV system, synthesizing a playable color stripe signal with negligible display artifacts while providing an effective copy protection signal on a VCR or other video tape recorder is a challenge. For example, the more effective the color stripe signal is on a particular video tape recorder in preventing copying, the more likely that undesirable playability artifacts (on a TV display) are noticeable. Some PAL color stripe processes therefore are not commercially viable because of such display artifacts, and thus not implemented.

In recent years with the decline in VCR sales and usage, newer video recorders such as digital Personal Video Recorders have replaced the older VHS (analog) video tape recorders also referred to as VCRs. These digital video recorders use a different type of recording system, which generally includes a color stripe detector as explained above for reading or detecting the incoming color stripe signal. Once a color stripe copy protection signal is detected in a video signal, a content control command is generated by the detector, such as "Prohibit Recording/Viewing". A "compliant" digital video recorder can then accept the content control command to stop recording or to replace/mute the program video signal with another signal such as a blue screen. Brill et al., U.S. Pat. No. 6,600,873, incorporated by reference in its entirety, discloses how a compliant device such as a video recorder includes special detection circuitry to detect the color stripe signal and producing in response a control signal which disables the recorder, to prevent further recording. The same concept is embodied in commercially available integrated circuit video decoders which detect the color stripe signal and in response issue commands to control operation (such as no recording) of a compliant device such as a video set top box, personal video recorder or other in which the video decoder is installed. Such video decoders are generally referred to in the field as "Macrovision compliant". Examples are the Texas Instruments TVP5146 video decoder and the Micronas AVF4910B video pixel decoder. See also Macrovision Corp. patent publication WO 2005/039176A1 disclosing use of analog copy protection to encode permitted use information, incorporated herein by reference in its entirety.

It is also known to provide a modified or weakened color stripe signal that is so detectable, but is not necessarily effective as a copy protection signal on a VHS video tape recorder or other video tape recorder. Ryan U.S. Pat. No. 4,626,890 and Quan et al. U.S. Pat. No. 5,784,523 both incorporated by reference in their entirety, further show ways to defeat the effects of color stripe signals by removing the incorrect phase in at least a portion or the whole of a color burst envelope. Normally one would conclude that by modifying a color stripe signal so as to defeat its color copy protection effects, the color stripe signal would also be not detectable in a compliant content control system (detector). But it has been found that one or more color stripe "defeat" aspects of Quan et al. U.S. Pat. No. 5,784,523 can be applied to improve playability of a video signal on a TV display set while defeating color stripe copy protection effects on a video tape recorder and still allowing color stripe detection in a compliant device (e.g., to cause the compliant device to prevent recording); see U.S. application Ser. No. 12/350,740, filed Jun. 8, 2009, Cloutman et al., incorporated by reference in its entirety.

The present disclosure further pertains to video receivers and tuners that play video received from an external source and produce there from an analog video signal output which includes a weakened or defeated form of the color stripe process. These receivers and tuners play such video which also may include anti-copy bit(s) or signal flag(s), which when detected in the receiver or tuner, applies an appropriate analog (e.g., color stripe) content control signal. In prior implementations, receivers provided copy protection signals that were effective on downstream video recorders such as tape recorders. However, with the decline in use of analog VHS and other video tape recorders (also called VCRs) and increased use of digital recorders, such copy protection signals for analog video tape recorders become less useful. To provide an effective copy protection signal for any video recorder, playability must be taken into consideration. So generally those copy protection signals most effective on a VCR are not provided commercially because of playability problems. Thus, for a commercial process, an effective copy protection signal generally must minimize playability artifacts. Thus prior receivers or tuners provide an effective copy protection video signal while being acceptable in playability, and while being very effective on a downstream compliant content control device. A compliant content control device reads and/or senses the copy protection signal and provides commands to shut down the recorder, to limit recording use, etc. as explained above. However, an "effective" copy protection signal generally is "overkill" for such a compliant device. Thus, a "weakened" or "defeated" copy protection signal will provide optimal video playability while still providing effective content control in a compliant device, without regard to copy protection effectiveness on a (non-compliant) VCR. One such copy protection signal is the color stripe signal described above, and a variant of the color stripe modified color burst signal is used in embodiments disclosed here.

The "weakened" color stripe signal as described here may be combined with other video copy protection signal modifications such as AGC and/or pseudo sync pulses in a portion of the horizontal and/or vertical blanking interval, lowered portion of the front and/or back porch of a video signal, lowered portion of an active field of the videos signal (e.g., included lowered portion of one or more TV lines of the program video signal, and/or lowered portion of one or more TV lines of any letter boxed region, or bordered region.), and/or sync modifications in amplitude, position, and/or width.

In one embodiment a video tuner or receiver in accordance with the invention receives from an external source a digital video signal or video file which includes, e.g., APS (Analog Protection System) bit(s) or other control bit(s) (data or information) and couples the digital video signal to a reader or bit detector also part of the tuner or receiver (e.g., for APS, control, mode, and/or configuration of content control signal). The output signal of the reader or bit detector is coupled to a generator or a programmable generator in the tuner or receiver to provide a response to the weakened color stripe signal, which is generally not effective for copy protection on a downstream (non-compliant) VCR but is effective when detected by a compliant downstream content control device or other compliant apparatus (e.g., an analog to digital converter, PVR and/or video display). Depending on the output of the sensing circuit or reader, the weakened color stripe signal may be enabled, disabled or modified. The weakened color stripe signal generally is synthesized in the tuner or receiver by a digital to analog converter and/or encoder circuit and for example, coupled to the analog video output terminal of the tuner or receiver for transmission to the downstream device.

Note that a tuner or receiver in accordance with the invention may be (or may be incorporated in) a TV set, set top box, a mobile telephone, a PVR, a VCR, a network hub, wireless router, a modem, a storage unit linked to a network or a transmission, an IPTV (Internet Protocol Television) device, and/or a computer with network access (e.g., Ethernet, wireless, and/or optical link).

In one embodiment, the tuner or receiver is a digital set top box device which receives a digital video signal (by coupling to a transmitted or streamed source), which is coupled to a digital to analog converter (DAC) and/or encoder, wherein a generator or programmable generator is coupled to or part of the encoder and/or DAC, and wherein the output of the digital to analog converter provides the weakened color stripe signal to, e.g., a television set. In this embodiment, no control bit or APS bit is required or needs to be read to activate the weakened color stripe signal applied at the analog output terminal of the tuner or receiver.

In another embodiment, the tuner or receiver outputs the weakened color stripe signal in video signals also including program content that conform to, e.g., the 240p, 480I, 576I, PALN, PALNC, PALM, PAL, and/or NTSC television standards (not limiting). The tuner or receiver may insert or add into the output video signals copy conventional protection waveforms which are, e.g., AGC pulses, AGC and pseudo sync pulse pair signals, lowered portion of back porch, lowered portion of front porch, lower portion of one or more lines in the active TV field. The tuner or receiver (e.g., being a modification of a conventional DVD player or Blu-Ray player), when switched to the 1080I TV standard and/or to a progressive TV standard such as 480p, 576p, 720p, and/or 1080p, provides pseudo sync and/or AGC pulses (or positive going pulses in the VBI and/or HBI) in selected TV scan lines (via a DAC, pulse generator, and/or encoder circuit).

In yet another embodiment of the tuner or receiver, a waveform (signal) generator circuit in the tuner or receiver provides waveforms including pseudo sync (synchronization) and/or horizontal sync pulses in a position, pulse-width, and/or amplitude modulated manner combined with a circuit or generator that synthesizes the weakened color burst signal.

Such tuners or receivers which output a weakened color stripe signal may further include conventional circuitry and software and mechanisms to play conventional digital media such as CDs, DVDs, Blu-Ray discs, HD-DVD discs, video tape, magnetic disk, and/or solid state memory devices. Examples of the tuner or receiver may thus include modified DVD players, Blu-Ray players, hard disc players, video tape players, and/or USB accessible solid state memory, built in solid state memory, and/or flash memory players (where the memory devices can be internal and/or externally accessed). In some tuners or receivers, a combination to two or more readers or players may be present such as a video tape player in combination with a Blu-Ray or DVD player or memory device player. Such tuners or receivers may include a television tuner and/or demodulator, but not necessarily. For instance, Internet based devices such as certain mobile telephones, some Blu-Ray DVD players, and computers cannot generally receive cable or broadcast or satellite TV video signals, but can receive video files over the Internet, and are a type of (IPTV) receiver. All such devices are generally referred to here as a tuner or receiver or video receiver apparatus.

Some such tuners or receivers allow for external coupling via a USB or IEEE1394 or similar connection (e.g., Ethernet) for receiving a digital video program from an external source (not necessarily a television transmission), which when converted to an analog video signal include the weakened color stripe signal. Another embodiment of the tuner or receiver includes an external memory connection (e.g., USB or FireWire IEEE1394), LAN, and/or Ethernet to modify or update any of the analog copy protection waveforms mentioned while allowing the tuner or receiver to include at its analog video signal output a weakened color stripe signal. In yet another embodiment the tuner or receiver may reside in a computer and/or a display, which outputs an analog video output signal that includes a weakened color stripe signal.

The present modified or "weakened" (also referred here to as "defeated") color stripe signal (e.g., as providing a content control signal or record control signal) may also be combined with other well known analog video copy protection waveforms such as pseudo sync and/or AGC pulses. Also, one may combine the weakened color stripe signal with other copy protection methods such as sync narrowing, level shifting a portion of the video signal such as a lowered portion of a front or back porch region or an active field (e.g., when compared to another portion of the video signal such as a portion of the vertical blanking interval).

One may generate two or more types of defeated or weakened color stripe signals such that when combined with other waveforms, different types or levels of copy protection can be identified such as the well known Macrovision Corp. Type 2 or Type 3 or Type n. A Type n copy protection signal can be linked to the well known APS (analog protection system) trigger bits that are used in tuners or receivers such as those built into some DVD players, and/or television (cable or satellite TV) set top boxes or the like.

The tuner or receiver may provide a weakened color stripe signal that is detectable by a detection system, but does not have appreciable color copy protection effectiveness on a non-compliant video tape recorder.

The tuner or receiver may provide a weakened color stripe signal color burst modification which also has an extended color burst envelope. For example, a normal color burst includes about 8 to 10 cycles of subcarrier frequency (e.g., 4.43 MHz). Embodiments of the invention include greater than 10 cycles of subcarrier for the color burst modification.

The tuner or receiver generally may include more subcarrier cycles of substantially normal phase than cycles of incorrect phase in the weakened color stripe signal (e.g., the color stripe signal is reduced or weakened in providing the above described color copy protection effects to a (PAL) standard video tape recorder). In Wrobleski et al. U.S. Pat. No. 6,516,132 incorporated by reference in its entirety, a color stripe signal with improved playability but which is copy prevention effective is provided having at least equal or more in number of subcarrier cycles of incorrect phase compared to the number of subcarrier cycles of correct (normal) phase. Commercially available color stripe detectors, as referred to above, by design detect this type of color stripe signal. In one example, in U.S. Pat. No. 6,516,132 two cycles of added incorrect phase form an extended color stripe color burst envelope to provide an effective color copy protection signal to a VCR, and to afford detection by such color stripe detectors.

Embodiments thus utilize color stripe modifications of the general type shown in U.S. Pat. No. 6,516,132 where segmented (partial) color burst modifications provide a reduced or defeated or weakened copy protection effect by generally providing a color burst with fewer cycles of incorrect color burst phase than those with correct (normal) phase. One or more of this weakened type of color burst modifications is detectable by a commercially available color stripe reader/detector as described above. In an example, two subcarrier cycles of normal (correct) phase are added to the color burst to form an extended color stripe color burst envelope to provide reduced or defeated color copy protection effectiveness on a VCR, and also to still provide color stripe detection for content control purposes.

For example, in one version of a "defeated" color stripe PAL signal (e.g., a two video line color stripe color burst signal with more cycles of normal phase than incorrect phase), which was recorded, negligible color stripe effects were observed upon playback of the video by a VHS type VCR. Yet this "defeated" color stripe PAL signal was detected successfully (as a color stripe signal) by an available Macrovision Corp. compliant video decoder.

The present weakened or defeated color stripe signal may be combined with any known copy protection enhancement signal (e.g., level shifting a portion of the video signal or any waveform described in Wonfor et al. U.S. Pat. No. 5,583,936 incorporated by reference in its entirety) any part of a basic copy protection signal such as AGC and/or pseudo sync pulses, and/or any modification in one or more sync signals (e.g., sync amplitude, sync level shifting, sync width modification, and/or sync position modification).

DETAILED DESCRIPTION

Figure 1A:
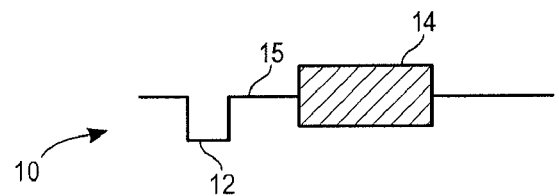
FIG. 1A shows in the prior art an effective copy protection color stripe signal as a waveform.

FIG. 1A shows a prior art video waveform 10 which is a mostly conventional TV horizontal blanking interval having horizontal sync pulse 12, color burst 14 and breezeway 15 but wherein 8 to 10 subcarrier cycles of the color burst 14 (indicated by the hatching) are modified in phase to about 180 degrees from the normal (conventional) phase. Conventionally the horizontal axis is time and the vertical axis voltage (amplitude). Ryan U.S. Pat. No. 4,577,216 incorporated herein by reference in its entirety teaches that a number of horizontal lines of a video signal with this type of modified color burst 14 yields effective copy protection when applied to a video tape recorder. The hatched color burst 14 denotes the incorrect (modified) phase (also referred to as phase angle) such as a departure of 180 degrees from the normal color burst phase angle of zero degrees of a color video signal for these subcarrier cycles.

Figure 1B:
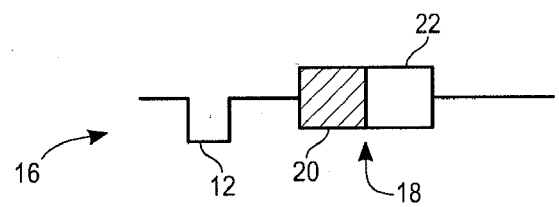
FIG. 1B shows in the prior art a copy protection effective split burst (segmented) color stripe signal as a waveform.

FIG. 1B, also showing a prior art waveform 16, is a variation of FIG. 1A in which at least half the cycles of an entire color burst envelope 18 are shifted so as to have an incorrect burst phase. In this example, the color burst envelope 18 is a "split" (segmented) color burst illustrated as a hatched portion 20 of incorrect phase and a second portion 22 of correct phase. For an effective copy protection signal to produce noticeable color distortion when recorded by a VCR, at least half of the total burst envelope 18 duration is modified to the incorrect phase 20. For example, the duration of the hatched incorrect portion 20 is equal or greater than the correct portion 22 in burst envelope 18. Such a waveform may also include an extended color burst envelope 18 wherein cycles of preferably incorrect phase start ahead of a normal color burst envelope, as explained below.

Figure 1C:
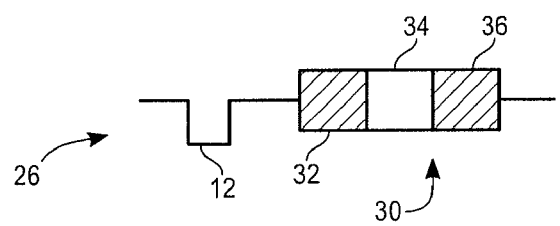
FIG. 1C shows in the prior art another effective split burst copy protection signal as a waveform.

FIG. 1C shows another variation of FIG. 1A, which provides an effective (in terms of copy prevention) color copy protection signal 26 to a video recorder. In this example, the color burst envelope 30 is segmented (split) into three (or more) portions 32, 34, 36. Again, the hatched areas 32, 36 denote incorrect color burst phase while middle portion 34 denotes normal color burst phase. In general, as long as there are more subcarrier cycles of incorrect phase than normal or correct color phase, the modified color burst 30 provides an effective copy protection signal. Here the total duration or number of subcarrier cycles of the portions 32, 36 is greater (or equal) than the middle portion 34 to provide an effective color stripe signal.

Figure 2A:
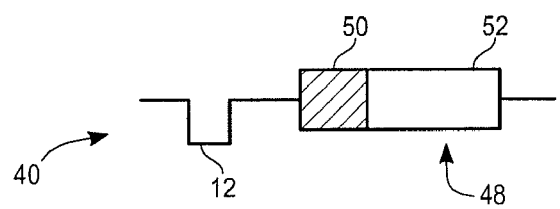
FIGS. 2A and 2B show "defeated" color stripe signals used in accordance with the invention as waveforms.

FIG. 2A illustrates a weakened color stripe waveform 40 used in an embodiment of the invention. (FIGS. 2A to 9 are the same as in U.S. application Ser. No. 12/350,740.) Here modified color burst 48 has fewer cycles of incorrect phase angle in section 50 than cycles of correct phase angle in section 52. While this type of modified burst 48 is disclosed in Quan et al. as a way to defeat or reduce copy protection effectiveness or to improve on playability effects, the present inventors have found that this "defeated" or weakened color stripe signal is still detectable by commercially available color stripe detectors of the type described above.

Although the color stripe incorrect phase angle may be in the range of 20 degrees to 180 degrees (normal phase angle being 0 degrees), in some examples a phase of about 180 degrees for the incorrect burst phase portion is preferable to a smaller phase shift. For example, in some PAL TV displays (TV sets or monitors), providing a modified phase of 90 degrees causes more noticeable playability artifacts than a modified phase of 180 degrees. When choosing an incorrect subcarrier phase from 20 to 180 degrees, intuitively it would seem that a phase angle less than 180 degrees would cause less playability artifacts (display problem). Thus it would seem that 90 degrees of phase shift would cause fewer display problems than 180 degrees of phase shift. Experimentally, it has been found that 180 degrees of phase shift for a color stripe burst, whether for a weakened or effective copy protection color stripe, actually causes less or fewer display artifacts than a 90 degree phase shifted color burst. So preferably, a weakened version of the color stripe here has in one embodiment 180 degrees of phase shift.

Figure 2B:
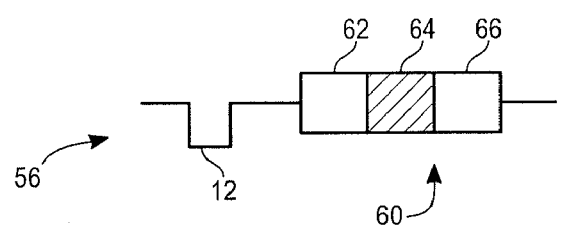

In another variation of such a defeated or reduced effectiveness copy protection signal, FIG. 2B shows a video signal 56 having a modified color burst 60, which as in FIG. 1C is a segmented (split) color burst. In this example of three segments 62, 64, 64 in the modified color burst signal 60, the number of incorrect phase subcarrier cycles is again less that the total number of correct phase subcarrier cycles. For example, the summed duration of the first and third segments 62, 66 with normal phase angle subcarrier cycles exceeds the middle segment's 64 duration, wherein the middle segment 64 includes the incorrect phase angle cycles.

Figure 2C:
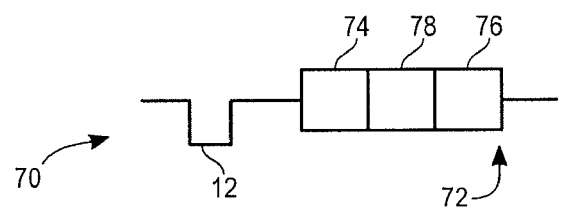
FIGS. 2C to 2F show additional defeated color stripe signals as waveforms.

FIG. 2C shows a video signal 70 having a weakened and segmented color burst 72 wherein incorrect phase angle color burst subcarrier cycles are in segments 74, 76, and/or 78, and wherein correct phase angle color burst phase subcarrier cycles are in modified color burst segments 74, 76, and/or 78 such that there are more subcarrier cycles of correct phase angle than incorrect phase angle. In some instances, the segment(s) that would include correct phase angle cycles may be blanked or attenuated. In other instances, the cycles of incorrect phase angle may have a lower amplitude level/magnitude than the correct phase angle cycles. Hence in an embodiment of the invention, it is possible to have more subcarrier cycles of incorrect phase angle than subcarrier cycles of correct phase angle, provided that one or more incorrect phase angle subcarrier cycles is sufficiently attenuated (e.g., reduced in amplitude, or blanked).

For example in general, the modified color burst 72 may include segments 74, 76, 78 with set (or programmed) amplitude, position, and/or phase angle. This means that each segment or section can be programmed in terms of amplitude, position or phase switch point, and/or phase angle such as 180 degrees. Color burst 72 represents a generic signal that can be provided in any Macrovision Corp. compliant (certified) integrated circuit for DVD players, etc.

Figure 2D:
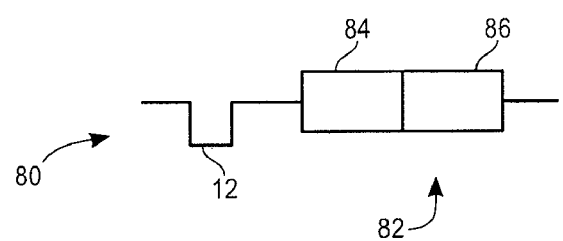
Figure 2E:
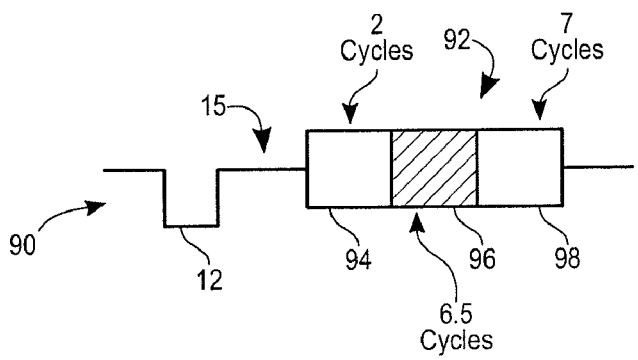
Figure 2F:
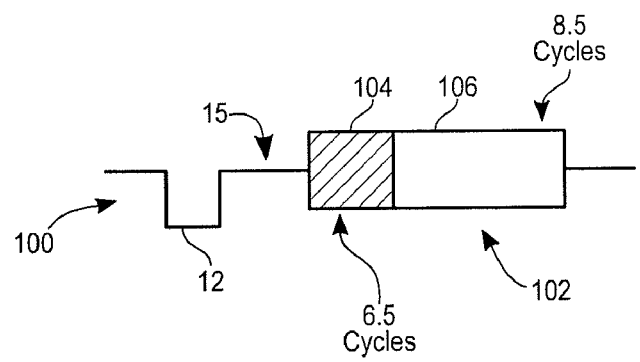

Similarly, in FIG. 2D for a video signal 80 having a two segment modified color burst 82, there are segments 84, 86. The position and/or duration of segments 84, 86 may be defined. This means that the phase transition or phase switch point in the split burst may be moved or varied in position, and that number or subcarrier cycles within each segment may be set to a specific number or cycles to provide a duration in each section of the modified color burst signal. So in one embodiment as described above, segment 84 may include "M" number of cycles of incorrect phase angle followed by segment 86 with "N" number of cycles of correct phase angle (or vice versa), where preferably, N>M. Segment 84 (or 50,62, or 74) may include cycles of subcarrier advanced or before the start of a normal burst envelope (e.g., include cycles of subcarrier in at least a portion of a breezeway after a trailing edge of a sync pulse or modified sync pulse). It should be noted that the breezeway 15 in FIGS. 2E, 2F, and/or 3 may be a gap width between 0 microsecond and about 2 microseconds. For example, when breezeway 15 is close to 0 microsecond, cycles of subcarrier (correct or incorrect phase/frequency) would start right after sync pulse 12's trailing edge. FIGS. 2E and 2F are specific examples of the weakened color stripe signal, whereas FIGS. 2C and 2D are general examples.

FIG. 2E shows an embodiment similar to that of FIGS. 2A to 2D for PAL (or NTSC) TV standard video. For a video signal horizontal blanking interval 90 having a 4 or more line (per band) colorstripe signal in color burst 92, in segment 94 two cycles of normal phase angle are followed by a segment 96 having 6.5 cycles of incorrect phase angle, followed by segment 98 with 7 cycles of correct phase angle. Note that the number of cycles per color burst may be varied within +/−10%. Here segment 94 may extend into the breezeway 15.

FIG. 2F shows another embodiment for PAL (or NTSC) TV standard video for a video signal 100 having color burst 102 wherein a two or more horizontal line (per band) colorstripe signal has 6.5 subcarrier cycles of incorrect phase angle in segment 104 extending into the breezeway 15 followed by 8.5 cycles of correct phase angle in segment 106. Note again that the number of cycles may vary within +/−10%. Here segment 104 may extend into the breezeway 15.

Figure 3:
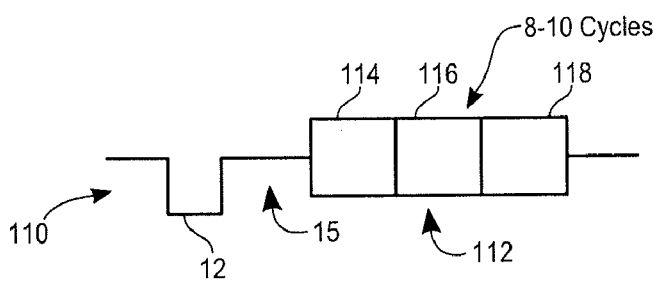
FIG. 3 shows a prior art color burst of normal phase and modified duration as a waveform.

FIG. 3 shows for video signal 110 an extended color burst 112 with segment 116 having correct phase angle, wherein a segment 114 of several cycles of correct phase angle is added in the breezeway area 15 and a segment 118 is added extending after the normal burst envelope 116 for at least some of the non-colorstripe TV horizontal lines, in accordance with the invention. By extending the duration of the burst envelope with correct phase angle, playability may be improved. For instance, when combined with colorstripe signals that have extended burst duration, color burst duration may be extended (e.g., with cycles of incorrect and/or correct phase angle) in the examples of FIG. 2A, 2B, 2E or 2F.

Figure 4:
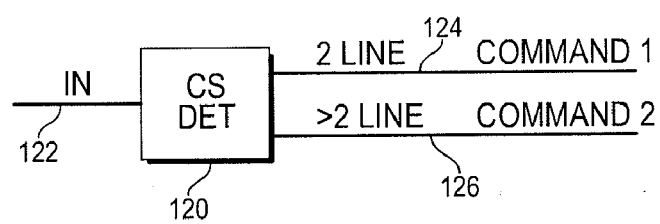
FIG. 4 shows a color stripe detector in a block diagram in accordance with the invention.

FIG. 4 shows a generic example of a color stripe (CS) detector 120 which senses color stripe waveforms in accordance with the invention which are applied at input terminal 122 and which outputs in response one or more (command) signals on terminals 124, 126. Detector 120 may be implemented a number of ways including as a phase detector (e.g., multiplier) or a burst continuation circuit, as explained in more detail below. The burst continuation circuit provides internally a substantially normal phase angle signal to be compared with the phase angle modifications of the input waveforms. The resulting (e.g., command) signals on terminals 124, 126 may for example, be a particular bit (digital) pattern signal "Command 1" when a weakened two line color stripe signal in accordance with the invention is read (detected). When a greater than two line weakened color stripe signal is read, a similar or different bit pattern signal "Command 2" may be generated. In FIG. 4 for example, when a two line weakened color stripe input signal is sensed, the "Command 1" signal is output, which can then control a device to add or encode or re-encode on the well known "Type 2" Macrovision Corp. compliant signals for copy control. Such a Type 2 signal would include or encode or re-encode a same (weakened or non effective) or different (an effective) color stripe signal and/or one or more of the following copy protection signals or signals that are a part of a copy protection or content control signal:

1) AGC pulses and/or Back Porch Pulses
2) Lowered portion of an active field or of a front or back porch region
3) Pseudo sync pulses and/or a narrowed sync pulse
4) N line color stripe signal Similarly for a greater than two line weakened color stripe input signal that is detected, the "Command 2" signal output on terminal 120 may produce the well known Type 3 Macrovision Corp. APS signal including the same or different color stripe signal as mentioned above and/or any of waveforms 1-4 listed above. An effective color stripe signal may include more cycles of incorrect phase angle than cycles of correct phase angle in a horizontal blanking interval, which may include an extended horizontal blanking interval.

Command 1 or 2 may direct a downstream device to mute, switch signal source, or shut down (e.g., upon sensing any of the "defeated" color stripe waveforms).

Figure 5:
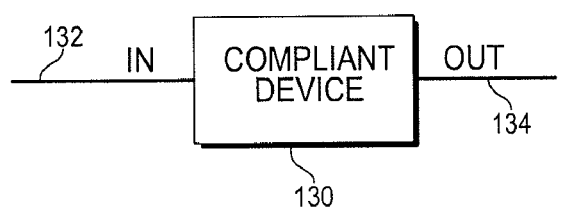
FIG. 5 shows a generic Macrovision compliant device in a block diagram which senses one or more video signal modifications.

FIG. 5 shows a typical compliant device 130 such as a video recorder, analog to digital converter, or video display device having video input terminal 132. Such a device 130 includes a detector 120 as in FIG. 4, and when any waveform in accordance with the invention is sensed, device 130 responsive to the detection stops recording, stops outputting a program video output, scales the video signal, and/or ceases to display the program video. Device 130 may re-encode, upon sensing any of the weakened color stripe signals (in any combination of basic copy protection signals and/or enhancement signals), a similar or different copy protection signal of like resolution (or like TV standard) or different resolution (or different TV standard) and output the resultant signal on terminal 134.

Figure 6A:
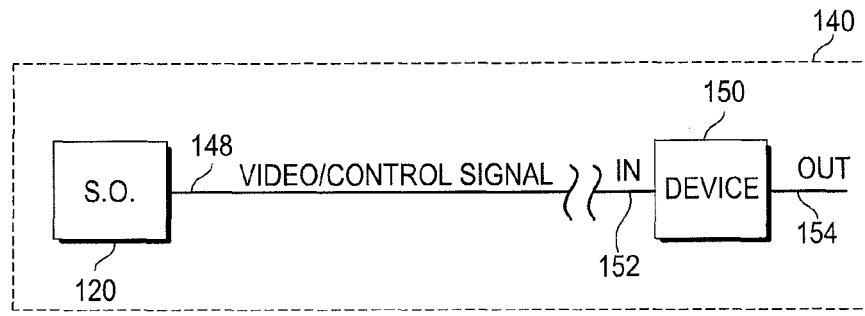
FIG. 6A shows an example in a block diagram of a system operator enabling or controlling one or more video signals in accordance with the invention.

FIG. 6A shows an example of a cable or satellite television distribution system 140 including a system operator (S.O.) 144 that provides or transmits video and control (analog or digital) signals via communications channel 148 to a customer video device 150 (e.g., a set top box, PVR, tuner, display, cell phone, etc.). Channel 148 may be optical, wireless, wired, cable, satellite, WiFi, WiMax, and/or the Internet. The signals on channel 148 may include program video and one or more control bits, bit pattern(s), or programming bits. Upon reception of these signals at terminal 152, remote video device 150 outputs the above described weakened color stripe waveforms when enabled by the control or programming bits or bit pattern(s) sent by system operator 144. Alternatively, device 150 may default to output one or more waveforms in accordance with the invention with or without the system operator transmission of the control or programming bits via channel 148 coupled to input terminal 152 of device 150. The output signal of device 150 at output terminal 154 is typically analog video including one or more weakened color stripe waveforms in accordance with the invention, which may be combined with any copy prevention signal such as pseudo sync pulses, AGC pulses (e.g., in a portion of the horizontal and/or vertical blanking interval), sync modification (e.g., sync reduction, sync level shifting, sync width narrowing/widening, sync position/shifting), and/or level shifting a portion of the video signal. In FIG. 6A the signal on channel 148 is generally a digital signal used in a digital delivery network such as a digital TV set top box without recording capability. It should be noted there are set top boxes today with recording capability, and thus FIG. 6A may apply to set top boxes with a recorder. FIG. 4 in contrast depicts a detector 120 which is generally used in a device that includes an analog input such as a recorder. This recorder would normally inhibit recording the program video upon detection of the analog weakened color stripe signal. Device 150 in FIG. 6A may include an analog input terminal (not shown), so then device 150 would include the apparatuses of FIGS. 4 and/or 5, a color stripe detector, and or recording device. Generally if a compliant device has an analog input terminal, it would include a detection system such as in FIG. 4, and also a compliant recording system as in FIG. 5. So there are actually some digital devices (e.g., a version of device 150) that can be connected to a digital network, where such devices include a recorder, and also accept one or more analog inputs. FIG. 6A thus is an example of how the weakened color stripe signal can be used in a digital delivery network, such as described in Wonfor et al. U.S. Pat. No. 6,381,747.

Figure 6B:
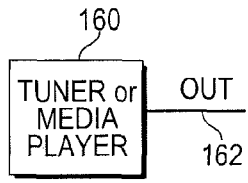
FIG. 6B shows an example in a block diagram of a playback or receiving device enabling, controlling, or providing one or more waveforms in accordance with the invention.

FIG. 6B shows an example of a media player and/or PVR, tuner, receiver, cell phone, digital media center, set top box, etc. 160 which outputs analog video on line(s) or terminal 162 including one or more color stripe waveforms in accordance with the invention, which may be combined with any pseudo sync, AGC pulses (e.g., in a portion of the horizontal and/or vertical blanking interval), sync modification (e.g., sync reduction, sync level shifting, sync width narrowing/widening, sync position/shifting), and/or level shifting a portion of the video signal. FIG. 6B thus represents various devices that may be connected to a system operator as in FIG. 6A, or a video delivery network not using a system operator as in FIG. 6A. For instance, the video can be sent via a home computer network.

Figure 7A:
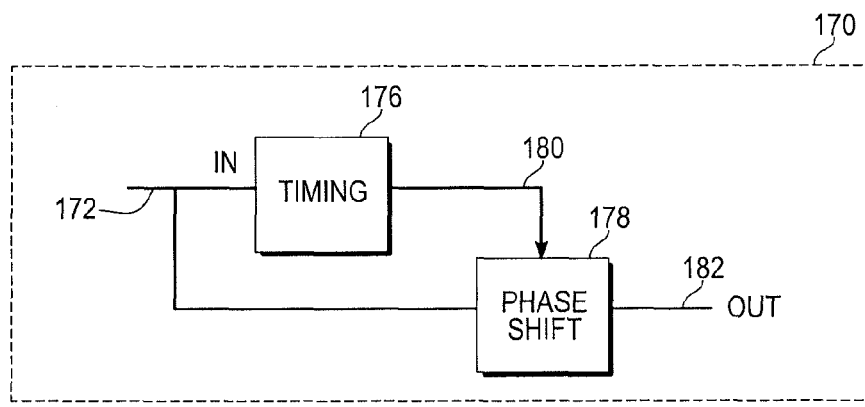
FIG. 7A shows an apparatus in a block diagram to provide one or more waveforms in accordance with the invention.

FIG. 7A shows in a block diagram an example of a generator apparatus 170 to generate weakened color stripe signals in accordance with the invention. The apparatuses of FIG. 7A or 7B or an equivalent circuit/system is present in device 150 or device 160 of FIGS. 6A, 6B. A conventional video signal is coupled to input terminal 172, which is coupled to a timing circuit 176. Timing circuit 176 provides a signal (that may be programmable by one or more control bits, not shown) for selected TV horizontal lines and pixels for a modified color burst. The video signal at input terminal 172 is then provided with a color burst signal that is phase shifted by phase shift or phase generating circuit 178 according to the timing output from timing signal circuit 176 on line(s) 180 to provide at output terminal 182 one or more waveforms of weakened color stripe. Phase shift circuit or phase generating circuit 178 may provide or insert a color burst of modified phase and/or duration for one or more segments of the color burst envelope as explained above. The video signal input at terminal 172 may be analog or digital.

Figure 7B:
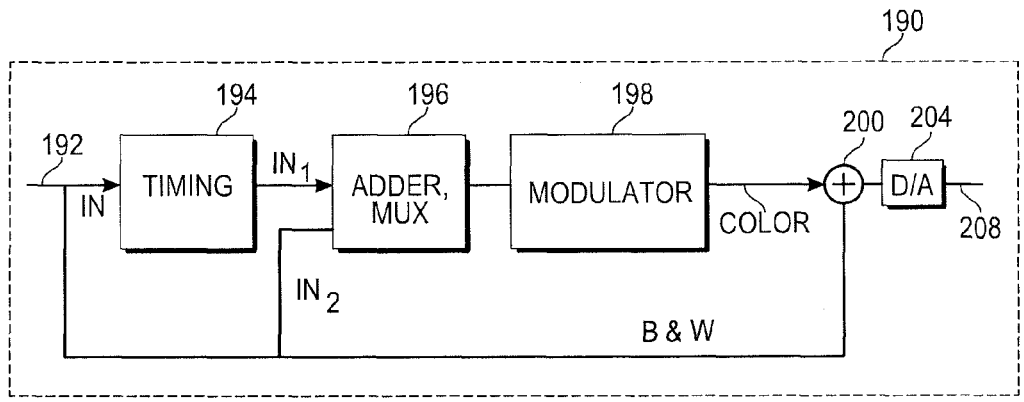
FIG. 7B shows another apparatus in a block diagram to synthesize or provide one or more waveforms in accordance with the invention.

FIG. 7B shows in a block diagram another generator apparatus 190 to generate such weakened color stripe waveforms. The input video signal is coupled to input terminal(s) 192. The video signal is thereby coupled to a timing circuit 194 and the output of timing circuit 194 provides a signal coincident with selected lines and pixels of the video signal for color burst modification. The output of timing circuit 194 is coupled to one input ($IN_1$) of a switching, multiplexing (MUX), inserting, or adding circuit 196. A second input ($IN_2$) to adding circuit 196 is from the video input terminal 192. The output signal from adding circuit 196 then has a modified portion of the horizontal blanking interval and is coupled to a (subcarrier) modulator (e.g., multiplier) circuit 198 to provide a color burst of modified phase, amplitude, position, and/or duration as described above.

Typically the input signal to terminal(s) 192 is a digital component waveform having Y, Pr, Pb component video or the like. The Y component signal is denoted as the black and white video signal (B&W) which is summed by adder 200 to a modulated color signal (via Pr and Pb multiplied by a carrier from modulator 198) including one or more color burst modifications to provide a composite (digital TV) signal. A digital to analog converter 204 then provides an analog video signal (e.g., composite video, Y/C video, or S-Video) at output terminal 208 that includes one or more color burst modifications in accordance with the invention. It is to be understood that an apparatus as in FIGS. 7A, 7B may be included in a video processor/encoder also performing other functions.

Figure 8:
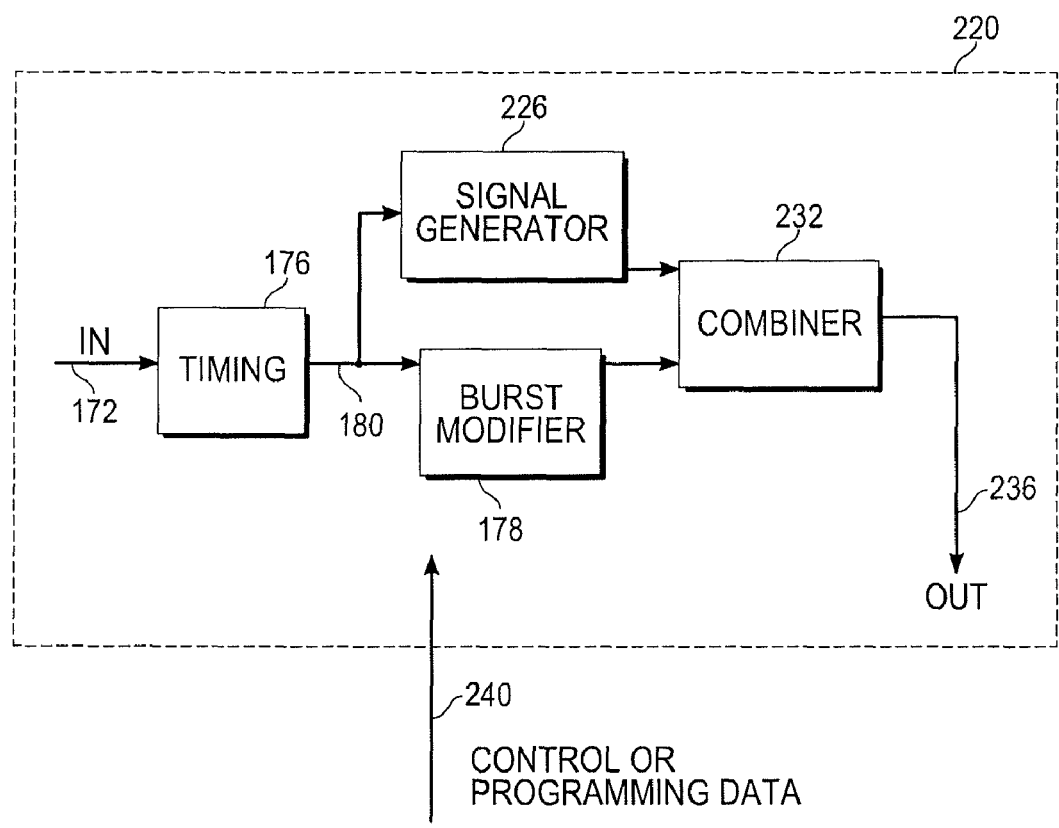
FIG. 8 shows an apparatus in a block diagram to provide one or more waveforms (and/or one or more basic copy protection signals or enhancement signals).

FIG. 8 shows in a block diagram a typical apparatus (e.g. an integrated circuit or portion thereof) 220, which allows one or more of the present color burst modifications to be combined with one or more basic copy protection signal(s) and/or enhancement signal(s) and is based on the FIG. 7A apparatus. A video signal is coupled to input terminal 172. Timing circuit 176 outputs signals as in FIG. 7A indicating selected lines and pixels for the color burst modification signal, and outputs signals in selected lines and pixels for providing ACP (copy protection) signals, which include:

1) Sync modification(s) such as sync reduction, sync level shifting, sync pulse width, sync amplitude, and/or sync position.
2) One or more pseudo sync pulses in an overscan area.
3) One or more AGC pulses in an overscan area
4) Modulation (e.g., amplitude, frequency, position, pulsewidth) of AGC, sync, and/or pseudo sync pulse(s).
5) Level shifting a portion of the video signal.

The output signals of the ACP signal generator 226, and burst modifier (e.g., phase shift or phase generator) circuit 178 are coupled to a combining circuit 232, which outputs a digital and/or analog signal with one or more color burst modifications in accordance with the invention, and which at the output terminal 236 may include any of the ACP signals mentioned above. Configuring, enabling, and/or disabling any of the signals mentioned (ACP and/or color burst modification) may be via a control signal or bit pattern applied at terminal 240. Thus, the (control) signal at 240 includes one or more bits or a bit pattern (e.g., from a system operator, a memory device, storage device, media, etc.).

Figure 9:
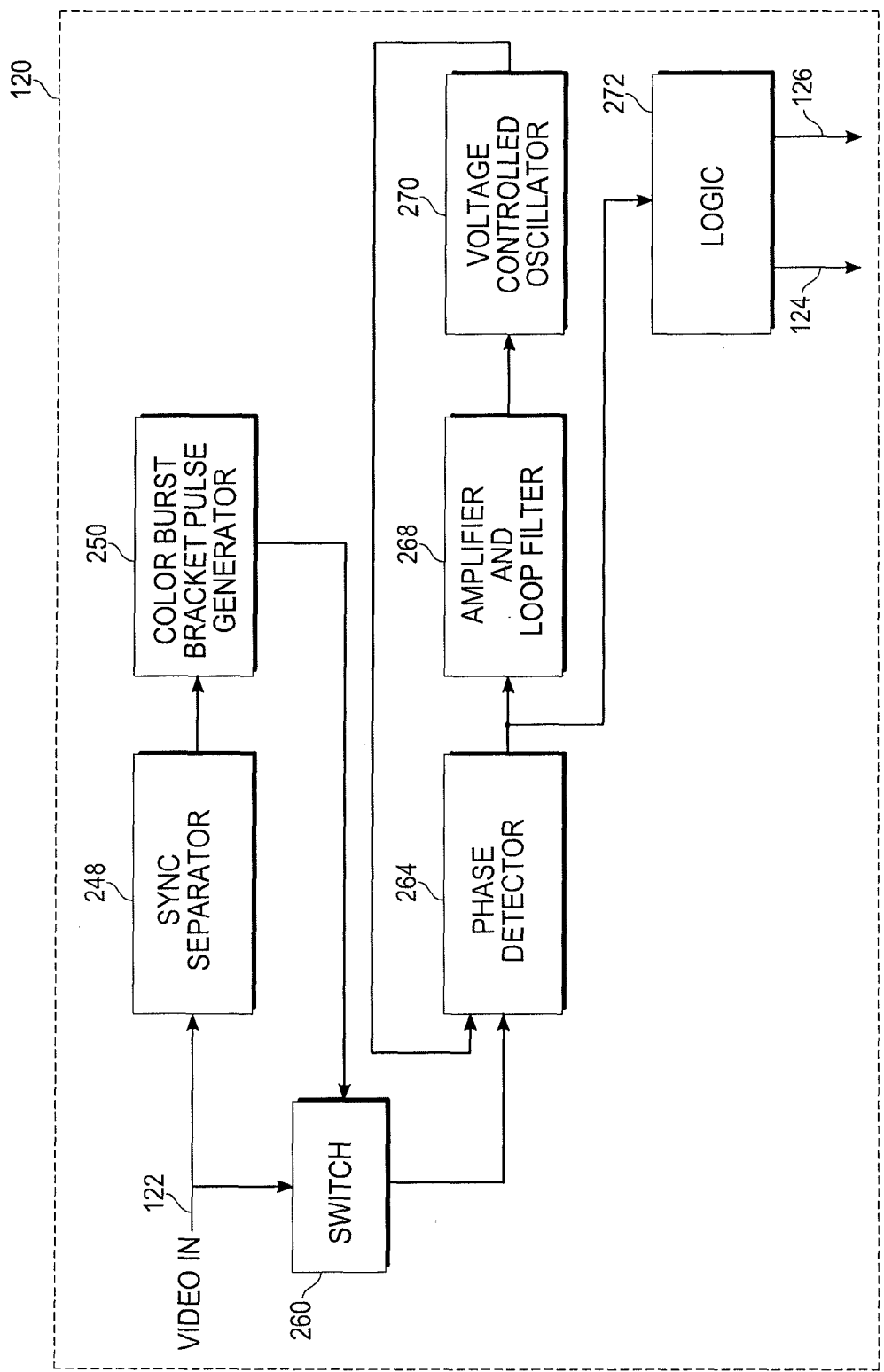
FIG. 9 shows detail of an apparatus in a block diagram as in FIG. 4 to detect waveforms in accordance with the invention.

FIG. 9 shows in a block diagram detail of an exemplary weakened or defeated color stripe detector 130 of FIG. 5, and which is somewhat similar to that of Brill et al. U.S. Pat. No. 6,600,873 referred to above. Like the other devices referred to herein, this may be embodied in its entirety or in part as an integrated circuit. Detector 120 has video input terminal(s) 122 coupled to sync separator 248 to separate out the synchronizing pulses in the input video. The extracted sync pulses drive color burst bracket generator 250 which is, e.g., a mono stable multivibrator outputting a signal of at least 1 μsec duration. The output signal of generator 250 is coupled to the control element of switch 260. Switch 260 thereby couples the input video to phase detector 264 during the expected duration of the color burst. The output of phase detector 264 is coupled to amplifier and loop filter 268, in turn coupled to VCO 270. The output of VCO 270 is coupled to a second input terminal of phase detector 264 to provide a phase lock loop circuit. VCO 270 provides a continuous signal that is phase locked to the average phase of all incoming color burst signals, wherein the majority of color burst signals are of normal phase. Phase detector 264 outputs an indication of incorrect phase to logic 272 which determines, based on the incorrect phase indications, the presence/absence of various versions of the color stripe process and outputs suitable commands on terminals 124, 126 as in FIG. 5. Further, a monostable multivibrator circuit is a type of a timing circuit useful here, as is any type of equivalent circuit such as a (digital) counting circuit to generate a timing pulse.

Figure 10:
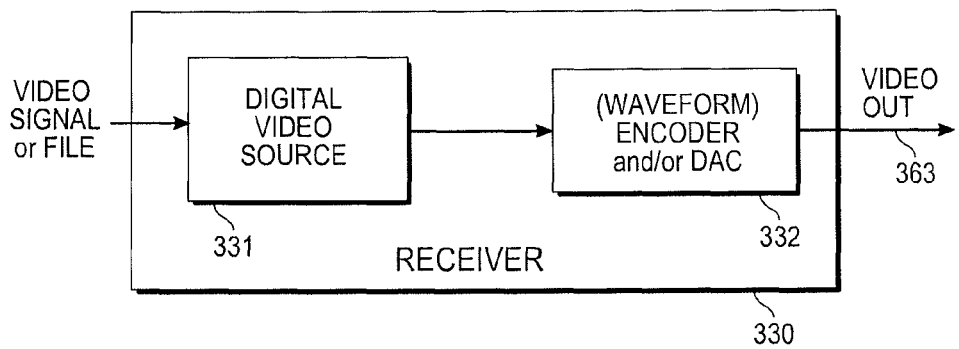
FIGS. 10, 11, 12, 13, and 14 each shows an example in a block diagram of a tuner or receiver which outputs the present record or content control (and/or copy protection) signals.

FIG. 10 illustrates in a block diagram an embodiment of a tuner or receiver 330. Such a receiver 330 may be a set top box (for receiving cable, IPTV, or satellite TV), a TV set, a mobile TV device, a mobile phone, and/or the like and including a (conventional) digital video source 331. Video source 331 is e.g. a conventional port for receiving a video signal and/or a video file such as from the Web, a digital network, an RF (radio frequency) signal source (such as cable, IPTV, or satellite TV), and/or an optical signal (which is conventionally converted to an electrical signal) as described above. Video source 331 may receive video programming or programs from a digital delivery network, the Internet, a LAN, WiFi, a wireless network, WiMax, and/or a system operator. The video source 331 may receive a digital video signal, RF (video) signal, and/or an analog video signal. Although not shown, receiver 330 may include the capability of receiving analog TV signals, with source 331 for example being an analog or analog/digital video source. Many receivers may include a combination analog and digital tuner for example to receive traditional AM/FM RF signals along with DTV signals such as multilevel vestigial sideband and/or phase modulated signals.

Also included in tuner or receiver 330 and coupled to video source 331 is a waveform encoding circuit (encoder) and/or digital to analog converter (DAC) 332 which provides a video analog output signal including one or more of the waveforms (i.e., the copy protection signals) described above which are a weakened color stripe signal, or provide improved playability in a record or content controlled (and/or copy protected) video signal in accordance with the invention. Video source 331 thus may receive signals from a wireless transmission, digital network, a wired network or cable system, and may further be coupled to receive video from a (conventional) recorded medium played on a (conventional) magnetic drive (e.g., tape and/or disc), a (conventional) solid state memory device (e.g., flash drive, compact memory card, memory card, SD card, memory chip(s)), and/or (conventional) optical disc playback device such as a CD, DVD or Blu Ray player (not shown).

The encoder and/or DAC (digital analog converter) 332 is coupled to the video source 331 and outputs an analog video signal including one or more of the record or content control and/or copy protection waveforms described above, thereby to provide an analog copy protected video signal, content control signal, and/or weakened color stripe signal at video output port 363. This record or content controlled (and/or copy protected) video signal may be "on" by default (e.g., any of the present record or content control or copy protection signals can be provided in the output signal of the media player 330 upon power up, or at all times) or turned on by one or more control bits (a command) provided from within the video source 331 or by externally provided signal(s). The DAC is used in embodiments where the digital video source 331 receives an encoded signal or other signal already containing a record or content control (or copy protection) signal.

Such control bit(s) or a bit pattern may select one or more record or content control (and/or copy protection) waveforms or video signal modifications at video output port 363. For instance, in a 525 or 625 scan line TV system, one or more weakened color stripe signals is added to a portion of the video signal (e.g., for the apparatuses of FIGS. 10, 11, 12, and 13) to provide a negligible color distortion effect on a VCR or TV, while causing a downstream (receiving) compliant device such as a recorder to receive and detect the weakened color stripe signal and thereby for example cause the compliant device or recorder to inhibit recording, limit recording time, limit the number of recordings, provide a time window for recording, and/or provide enhanced or degraded video and/or audio quality. For example, a compliant device provides record and/or content control of a video program.

Figure 11:
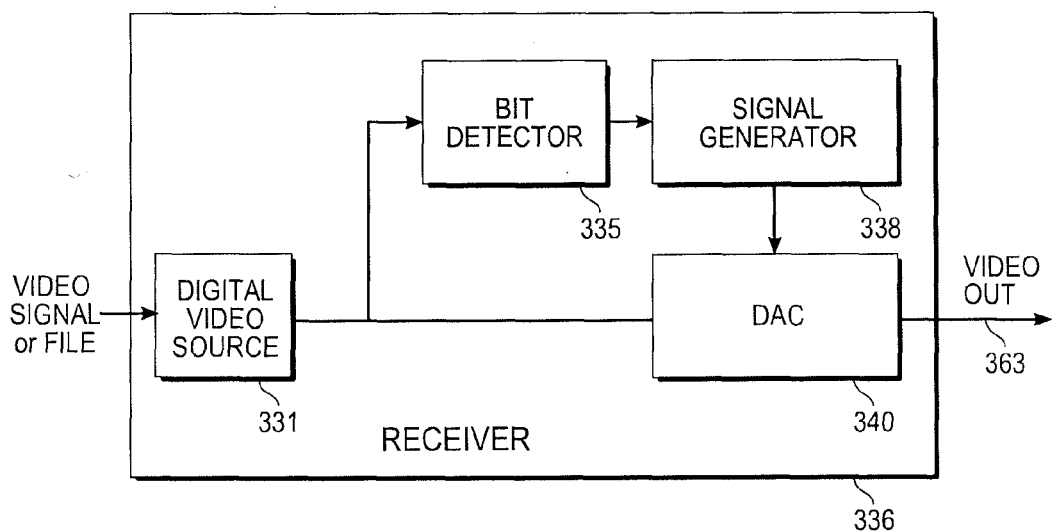

FIG. 11 illustrates a second embodiment of a tuner or receiver 336 that includes a record or content control (and/or copy protection) bit detector 335, here an AC (anticopy) bit detector. AC bit detector 335 reads or senses a digital bit stream in the digital video signal or file received at the video source 331. For example, upon sensing one or more such bit(s) in the output of video source 331, AC bit detector 335 transmits a command/or signal to a record or content control (and/or copy protection) signal generator 338 to provide one or more copy protection signals, or signal modifications as mentioned above, to a DAC (digital to analog converter) 340. DAC 340 in response outputs an analog copy protected video signal or content control signal at video output port 363, which includes record or content control and/or copy protection signals and/or weakened color stripe signals, and/or provides improved playability of the record or content controlled and/or copy protected video signal. Note that DAC 340 is also coupled to the video source 331 to convert the received digital video signal to analog form.

Figure 12:
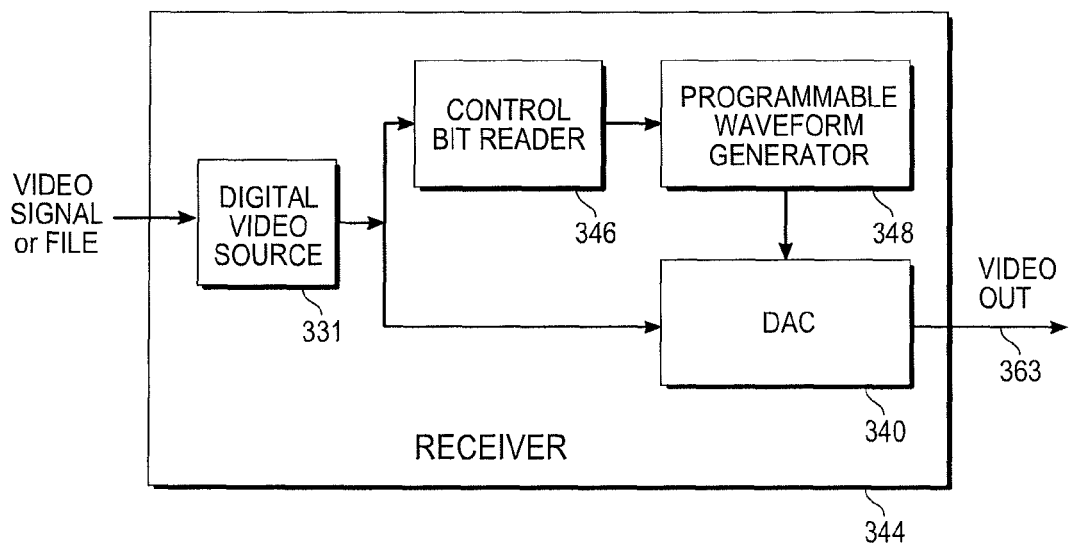

FIG. 12 illustrates a third tuner or receiver 344, with more flexible programmability of the record or content controlled (and/or copy protected) video signal. Video source 331 here is coupled to provide the digital signal or file to control bit(s) reader/sensing circuit 346, which typically outputs one or more signals to program various copy protection or content control parameters of the copy protected video or content controlled signal. Circuit 346 is coupled to control a programmable waveform generator 348 which thereby provides the flexibility for a user to program one or more record or content controlled (and/or copy protected) video signals and/or weakened color stripe signals. The digital output signal of waveform generator 348 is coupled to an encoder (which generates or provides color subcarrier signals including a weakened color stripe signal) and/or to DAC 340. The encoder is used in those embodiments where the weakened color strip signal may require provision of a modulated subcarrier in the digital domain. DAC 340 provides a weakened color stripe signal (in the analog domain) at video output port 363. For record or content controlled (and/or copy protected) signals generally the AGC or pseudo sync pulses or other luminance signal modifications from waveform generator 348 can be coupled directly to the DAC 340. DAC 340 is also coupled to the video source 331 (e.g., a tuner or demodulator by itself or a tuner or demodulator with a playback mechanism or media reader). Note that some set top boxes with programmability of the ACP waveform via generator 348 include tuners for TV and/or WiFi reception along with a playback mechanism for reviewing video or picture files. The analog output video signal at port 363 thereby includes a copy protected waveform, content control signal, and/or a weakened color stripe signal with programmability, and/or provides improved playability (e.g., a weakened color stripe signal that is ineffective on a VCR thereby provides improved playability over an effective color stripe signal) of the content controlled (or copy protected) video signal.

Such programmability, for example provided by the waveform generator 348, includes using conventional APS (Analog Protection System) bits to implement an APS defined Type-n signal. For instance, a Macrovision Corp. Type 1 APS signal may include pseudo sync pulses in selected TV lines. (An APS command conventionally generates a Type 1 or Type n signal. So the Type 1 signal must be tied to a particular APS bit pattern.) A Type 1 signal may include content control signal (and/or copy protection signal) such as sync pulse amplitude reduction in selected TV lines, lowered horizontal blanking interval front porch level in selected TV lines, and/ or lower back porch level in selected TV lines. A Type 2 (content control (or copy protection)) APS signal may include a Type 1 signal with a first type of color burst modification (CS) (e.g., partial, full or split burst weakened color stripe signal). Or an APS Type 3 signal may include a second type of color burst modification (CS) signal (weakened color stripe signal) along with a Type 1 signal. Note that a Type 2 signal may have an "M" TV scan line weakened color stripe process. A Type 3 process may have an "N" TV scan line weakened color stripe process (or vice versa). For example M<=2, N>=3.

Such programmability, accomplished for example via the waveform generator 348, may include programming the TV scan line assignment of the pseudo sync pulses, the number of pseudo sync pulses per scan line, the position of pseudo sync pulses, and/or the width of pseudo sync pulses. Programmability may include a negative or positive voltage level to be assigned selected TV lines for front and/or back porch region(s) of video line horizontal blanking intervals. U.S. Pat. Nos. 5,583,936 and 7,050,698 relate to adding or inserting an amplitude lowering signal in the front and/or back porch area; both are incorporated by reference in their entireties.

Lowering and/or raising levels in one or more selected portion of the video signal outside a horizontal blanking interval may be part of the programming capability (e.g., of the waveform generator or a biasing circuit). For example, a portion of the video signal waveform (such as the blanking level, front or back porch) of the video signal's VBI (vertical blanking interval) may be raised (or lowered) in terms of amplitude (voltage) with respect to one or more TV scan lines outside the VBI (or vice versa). For a color burst modification (e.g., the above described weakened color stripe process and/ or TV effective color stripe process), such programmability may include selecting TV scan line assignment for the modified color burst and/or unmodified color burst, phase angle, zone(s) of correct or incorrect phase, and/or duration of one or more zones of the color burst. Such modifications of the color burst are disclosed in U.S. Pat. Nos. 6,516,132 and 7,039,294, both incorporated by reference in their entireties.

Figure 13:
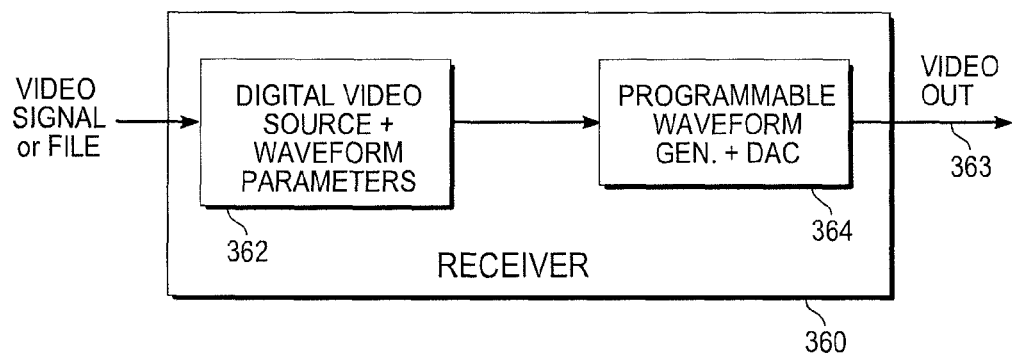

FIG. 13 illustrates a fourth embodiment of a tuner or receiver 360. Here a digital video source (similar to that in FIG. 12) 362 is coupled to a combined programmable waveform generator and DAC 364, where the digital video signal output from video source 362 includes, in addition to the video program signal, added waveform parameter information (bit or bits) which allows programming of the content control signal or copy protected waveform. The digital video source 362 thus may provide a signal from a television demodulator and/or tuner or from a solid state memory, optical disc, and/or magnetic disc or tape, which outputs the digital video signal containing programming information (or actual waveform(s)) for instance to provide flexible implementation of the content control signal or copy protected waveform, which can change from one recorded media version to another. For example, not only are the content control signals or copy protection signals or copy protected waveforms or weakened color stripe signal output from the programmable waveform generator and DAC 364, the copy protected waveform(s) and/or modified color burst signal (the weakened and/or effective color stripe signal) may be updated to a new waveform to further improve content and or copy protection effectiveness on a downstream VCR or compliant device, or to further improve playability. U.S. patent application Ser. Nos. 10/968,487 and 11/228,757 describe examples of programmability of record or content control or copy protection signals (e.g., programmability of copy protection or content control signals for any of the embodiments of the invention) from the media or external sources (e.g., for a media player or for a received transmission, updating its record or content control signal(s) (and/or copy protection signal) and/or modification to the video signal is provided via any combination of media, memory device, storage device, Internet, digital network, computer, etc); both applications are incorporated by reference in their entirety.

Figure 14:
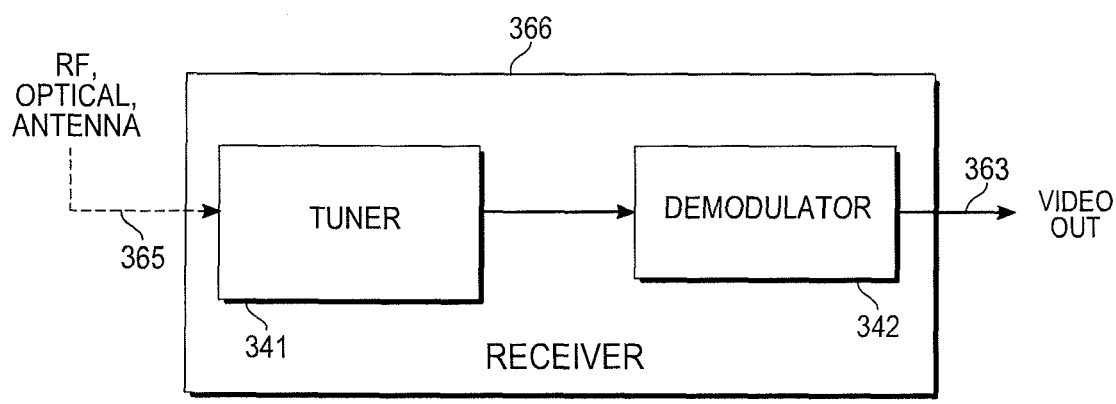

FIG. 14 illustrates another exemplary tuner or receiver 366. Here the video source of the receiver is a signal source 365 such as an antenna, RF source, and/or optical link that is coupled to an input of conventional TV tuner 341. If the signal is optical it must first be conventionally converted to the electrical domain. The output of tuner 341 is coupled to a conventional RF demodulator 342. Typical demodulators 342 include a circuit for I and/or Q demodulation, phase demodulation, amplitude demodulation, frequency demodulation, and/or pulse code demodulation. Tuner 341 may include a decompression system for processing signals which conform to standards such as MPEG-x, H.26x, advance video coding (AVC), wavelet, DCT, DFT, motion JPEG, motion GIF, or the like. The output port 342 typically provides a digital video signal but may include an analog video output when a digital to analog converter (DAC) is part of demodulator 342.

Although not shown in FIG. 14, an input port of a DAC may be coupled to the digital output port of demodulator 342 to provide an analog video signal which includes any of the present weakened color stripe signals. For an analog signal apparatus or application device, such as an analog mobile TV device, the FIG. 14 tuner or receiver may include an analog RF tuner 341 which includes RF demodulator 342 to detect or demodulate an analog TV transmission, e.g., vestigial sideband (amplitude modulated signal) transmission, from signal source 365. The output signal of demodulator 342 may be coupled to a circuit or apparatus which provides a video signal including one or more variants of the present weakened color stripe signal. The one or more variants of the weakened color stripe signal may be (further) combined with any of the basic copy protection signals and/or enhancement signals or processes described above. The output signal of demodulator 342 may include a control signal to enable or disable the weakened color stripe signal or copy protection signal, or include a control signal to program the weakened color stripe signal or copy protection signal. The control signal (e.g., for an analog or a digital TV system) may be embedded or added to the video signal via one or more of the following: a separate data channel, audio channel, video and/or audio watermarking signal, data signal added to the video signal's overscan area (such as a portion of the VBI or HBI or portion of an active TV line), a flag signal or broadcast flag, or a pedestal voltage in a portion of the video signal to convey a command for enabling or disabling or programming the weakened color stripe signal, content control signal, and or copy protection signal. Another embodiment includes a default enabling of the weakened color stripe signal. The control signal or control bit pattern may be derived from a metadata and/or program guide signal (e.g., IPG-Interactive Program Guide and/or EPG-Electronic Program Guide).

In the video receiver apparatus examples of FIGS. 10-14, changes to the (copy protection) waveform may be implemented responsive to commands provided from a source internal or external to the apparatus, such as a link to a transmission site or a "smart card" or similar storage or memory device thereby providing the programmability referred to above. U.S. Pat. Nos. 6,381,747 and 7,395,545, which describe a receiving system pertaining to providing signal modifications for content control (and/or copy protection) are hereby incorporated by reference in their entireties.

Figure 15:
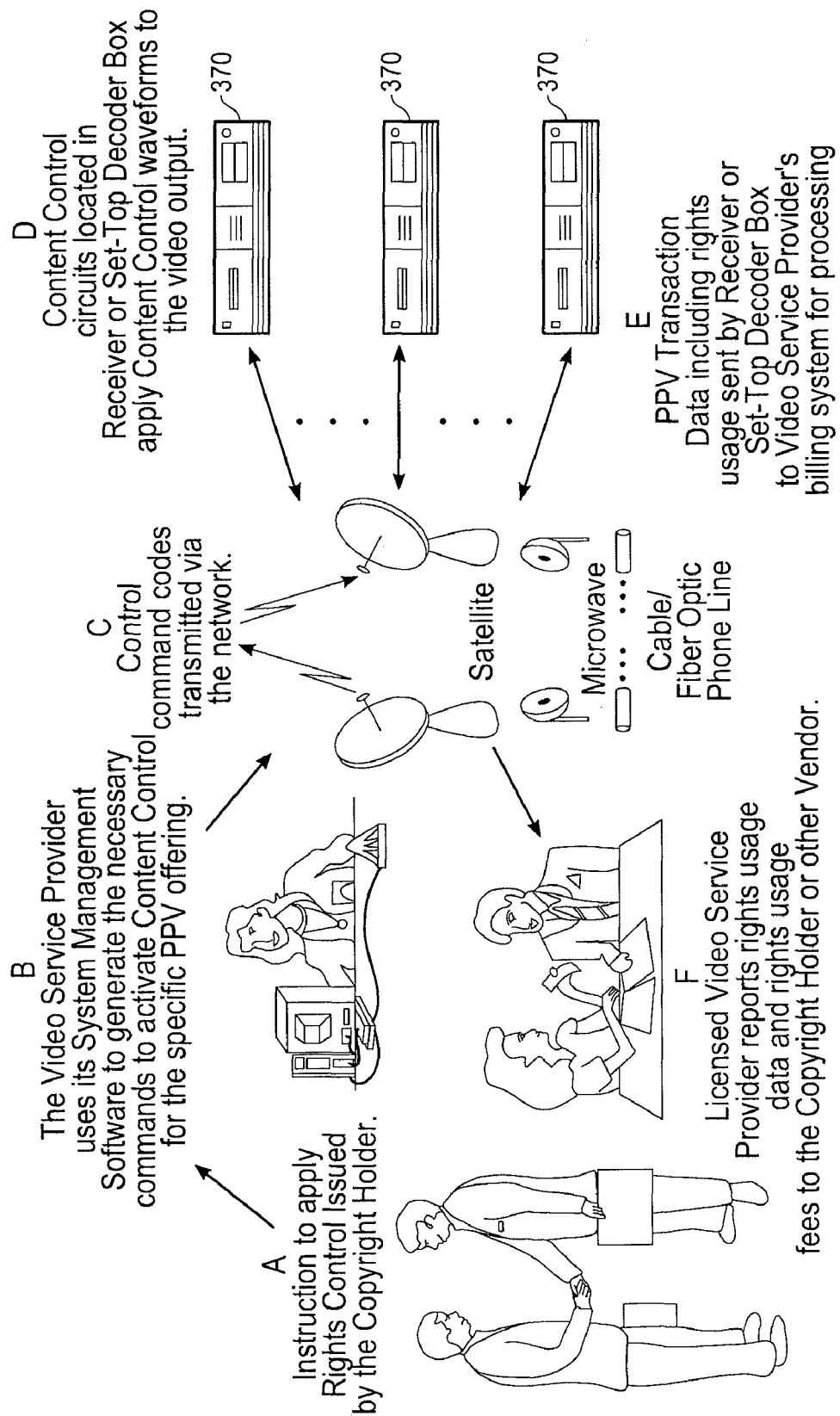
FIGS. 15 and 16 show diagrammatically systems using the present tuner or receiver.

FIG. 15 illustrates diagrammatically a control and tracking method and system for enabling and controlling application of record or content control (and/or copy protection) of video signals and the like via digital video networks. Part A represents the issuance of control instructions to video service providers by program rights holders who hold the program copyrights, for the application by the providers of record or content control (and/or copy protection) to the programs which are content controlled (or protected) by per-per-view (PPV) or pay-to-tape (PTT) or pay-to-record (PTR) requirements.

Part B depicts a control and billing center of those video service providers who supply record or content control signal (and/or copy protection signal) control software for the respective content controlled (and/or protected) programs being broadcast, to generate the commands required to activate, control and reconfigure the record or content control (and/or copy protection) process for each specific PPV/PTT program offering. Although a single provider is depicted, it is understood that part B represents any one of a plurality of video service providers each with their respective proprietary control and tracking (billing) software, in accordance with the present invention.

Part C represents the procedure of transmitting the particular record or content control (and/or copy protection) command codes of the respective providers, for the PPV/PTT program offerings, via the typical broadcasting networks. Such transmissions may be made by satellite, microwave link, phone line or cable transmission systems, as depicted.

Part D represents a subscriber's home, or other receiving facility, and includes a set-top box 370 for each subscriber. Each set-top box 370 contains record or content control (and/or copy protection) circuitry including a digital color encoder integrated chip (IC), which is adapted to apply selected record or content control (and/or copy protection) waveforms as described above to the analog or digital video signal which is supplied therefrom to a television set or monitor. Receiver (set top box) 370 is also shown in FIG. 16.

Part E represents the procedure whereby data identifying each PPV or PTT transaction, including content control or copy protection usage, is sent by the set-top box 370 back through the transmission networks of station C, generally to the respective video service provider's control and billing (tracking) center. The center includes billing procedures which are a subset of the system control software and which process the return transaction data to provide for billing the subscriber for the PPV or PTT transaction usage.

Part F represents the procedure whereby each video service provider reports the copy protection rights usage to the program (copyright) rights holder or other vendor, whereby the provider pays the record or control (and/or copy protection) fees to the rights holder, e.g., the licensor.

Figure 16:
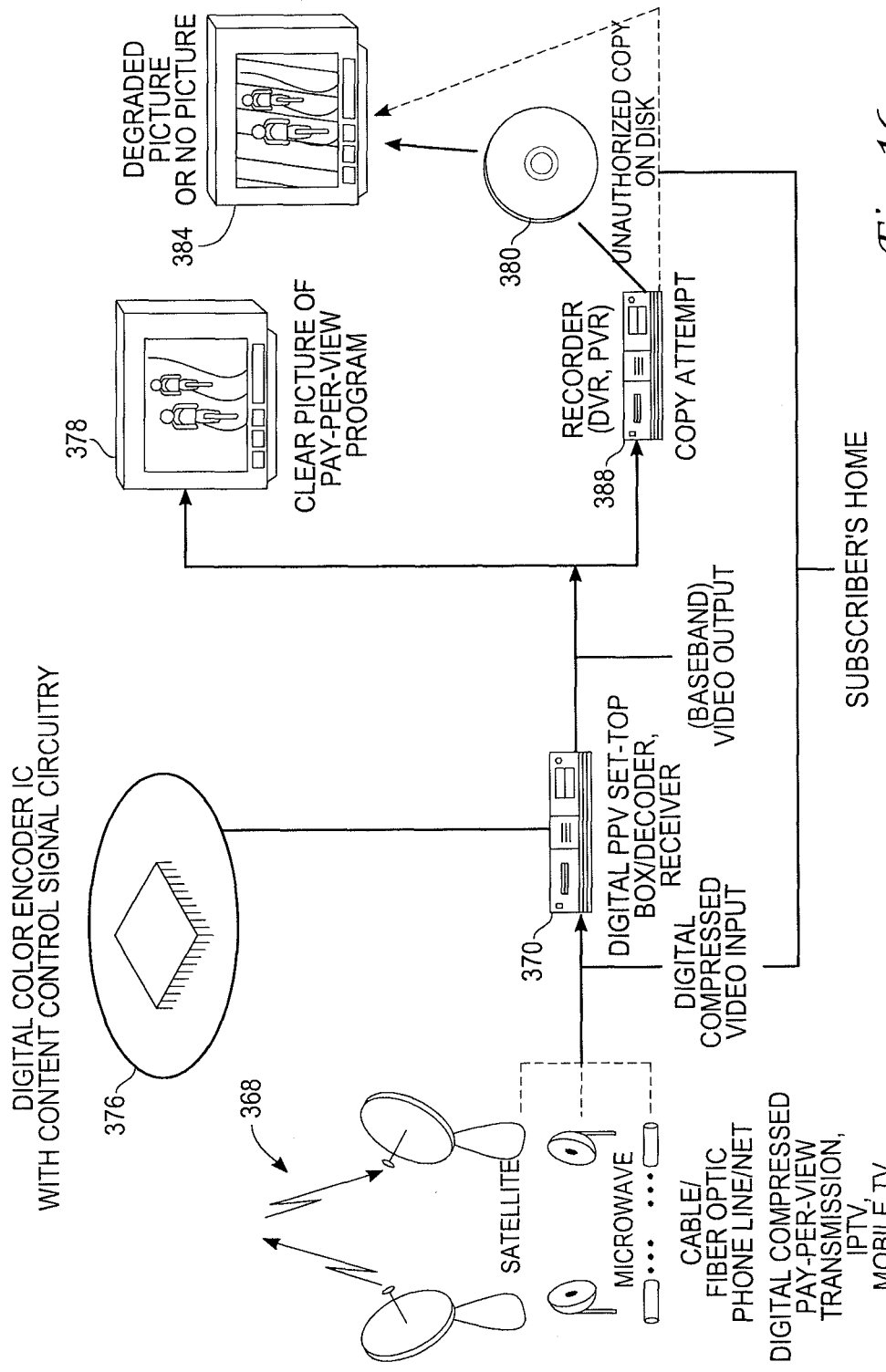

FIG. 16 illustrates in further detail the subscriber's facility, part D of FIG. 15, receiving the digital, and usually compressed, (pay-per-view) transmissions 368 from the broadcasting networks depicted as part C of FIG. 15 or from IPTV, mobile TV, handheld TV, WiFi, WiMax, a computer network, etc. The compressed digital video signal, or the like, is supplied to the respective set top box 370 which is one of many such set top boxes, wherein each set top box 370 includes as described above conventional circuitry for converting and decoding the digital compressed video signal to an analog (baseband RF) video signal. The set top box 370 also includes a digital color encoder IC 376 as described above which contains content control or copy protection circuitry for applying the selected record or content control (and/or copy protection) waveforms (signals) to the analog (or digital) video signal, namely, the programs which are being controlled in content (and/or being protected). In this example, the copy protected analog baseband video is supplied by the set top box to a conventional TV set 378 where the pay-per-view protected program is clearly displayed for viewing if the subscriber is authorized to view the program. If the subscriber is not authorized for a particular PPV protected program, the corresponding picture is modified so as to be unviewable. Examples of an unviewable picture include a scrambled picture, a degraded picture, a substituted video frame, etc.

In the event a subscriber records the (PPV) protected program via a conventional digital or personal video recorder 388 to obtain a recorded copy 380 on the disk drive of the recorder 388 without authorization, the unauthorized copy 380 will be degraded or altered to the degree that it is unwatchable, as depicted by TV set picture 384. In another example, video recorder 388 is a compliant device as described above (e.g., a video recorder with an installed content control system), and upon reading the video signal modifications received from set top box 370, the recorder 388 may shut down recording ("no picture" at TV set 384), limit recording, and/or provide an altered resolution or quality of recording. However, if the subscriber subscribes to a pay-to-tape or pay to record transaction and to the required higher PTT or PTR (PTT=Pay to Tape, PTR=Pay to Record) transaction fee, then the copy is authorized and the resulting (recorded) copy 380 would be readily watchable.

In the example of FIG. 16, the content control or copy protection signals from set top box 370, including a weakened color stripe signal, are coupled to a recorder such as a digital PVR (personal video recorder) 388. Recorder 388 may be or include a computing device such as a computer with video recording capability or an analog to digital converter device coupled to a computer or computing device for video recording. Within the recorder or analog to digital conversion device, a reader or sensing circuit will interpret one or more variations of the weakened color stripe signal to provide a content control command to the recorder or analog to digital converter device. Examples of a content control command may include any combination of the following: produce a poor/degraded signal or copy, cause a limitation in recording (e.g., limited time window of when a program be recorded, or limited number or copies of the video program), shut down recording, replace at least part of the program video signal with another signal, or produce an altered resolution TV signal. The video output of set top box 370 may include (other) copy protection signals such as AGC signals, pseudo sync pulses, lowered portion of a video signal, altered pulse width of sync pulses (e.g., narrowed selected H or V sync pulses), and/or added pulses in a portion of the active line whose negative portion includes a range from about blanking level to below blanking level (e.g., but not to sync tip level).

Figure 17:
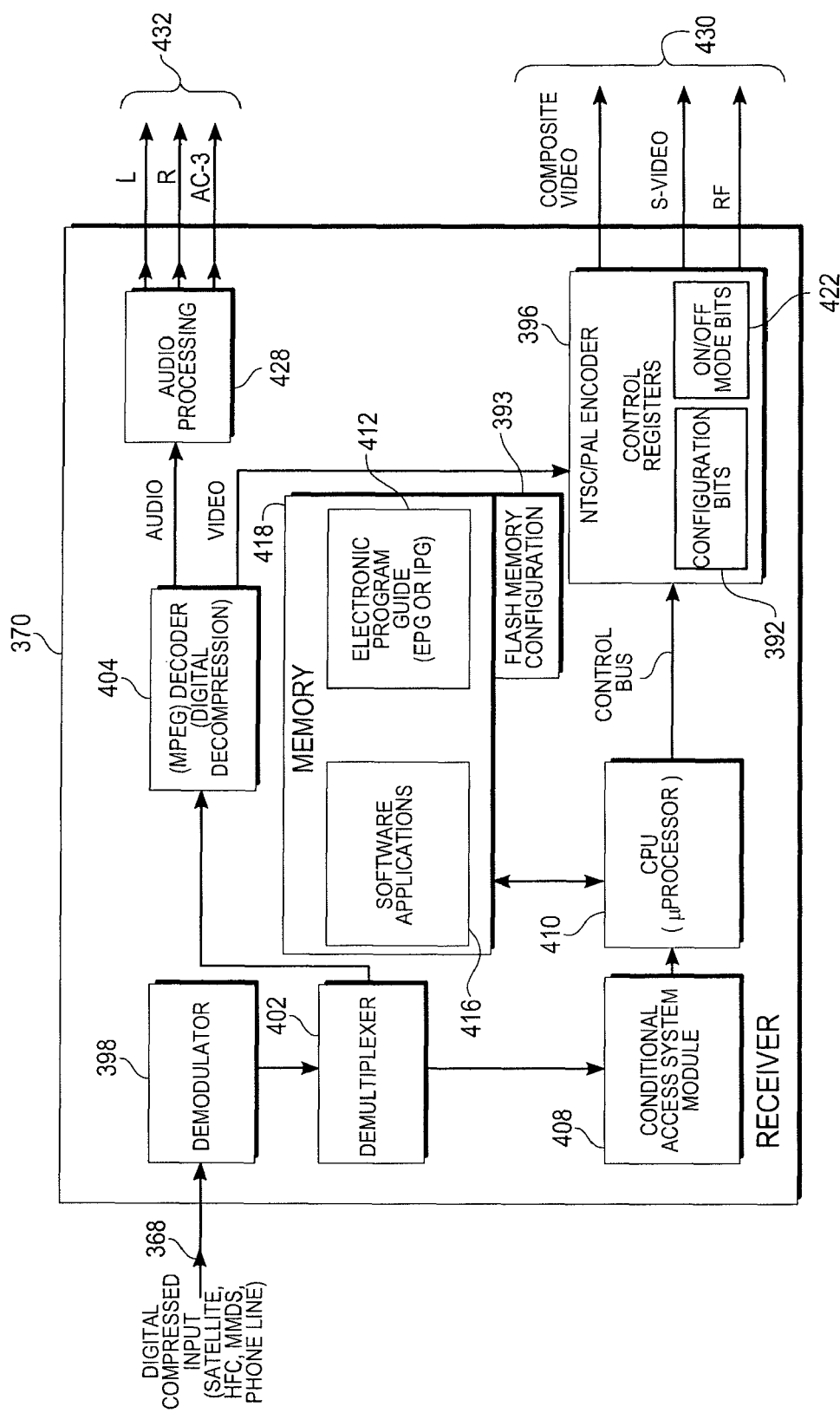
FIG. 17 shows in a block diagram a receiver which is a set top box.

FIG. 17 illustrates further detail of set top box 370 of FIGS. 15 and 16. For example, upon power up of set top box 370 the configuration bits stored in flash memory 393 are read and written into the appropriate CP (Content Protection or Copy Protection) control registers 392 in the NTSC/PAL video encoder 396. A compressed digital video signal (e.g., complying with MPEG-x, Wavelets, H.26x, JPEG 2000, AVC-advanced video coding, or DCT) including the content control or copy protection control commands described herein, is supplied by the delivery network 368 described above (satellite, HFC, MMDS, or phone line) to a demodulator circuit 398. The demodulated video/audio and control signals are supplied to a demultiplexer circuit 402 where the video and audio signals are separated into respective channels and supplied to an MPEG-2 or MPEG-x decoder and digital decompression circuit 404. The content control or copy protection control commands are supplied from the demultiplexer 402 to a conditional access system module 408. The commands are then supplied to a microprocessor (CPU) 410. The CPU 410 processes information located in memory 418 that is associated with an Electronic Program Guide (EPG) or Interactive Program Guide (IPG) 412 and runs the content control or copy protection application software 416 residing in memory 418 to deliver the activation command to the NTSC/PAL encoder 396. The EPG or IPG 412 may also have data which is used to determine if a signal related to record or content control and/or copy protection should be activated. There are other known methods that may be employed to activate copy protection.

In response to the control commands, the CPU 410 supplies control signals to the NTSC/PAL encoder IC 396. Encoder IC 396 includes copy protection control registers 422, 392 for respectively receiving and storing the on/off mode bits and/or configuration control bits. Configuration bits 392 determine the form of the record or content control (e.g., location of lines with weakened color stripe signal and/or the type of weakened color stripe signal), and/or copy protection (e.g., where the pseudo sync and AGC pulses will be located or positions of the colorstripe lines.) The on/off mode bits 422 determine which components of the record or content control (and/or copy protection) process will be activated, see Table 1 below. The encoder IC 396 also receives decompressed video from the MPEG decoder and digital decompression circuit 404. Encoder IC 396 outputs a RF signal, a composite video signal and/or an S-video signal via video output leads 430. The decompressed audio signal is supplied from decoder 404 to a conventional audio processing circuit 428 which, in turn, outputs left (L) and right (R) channel stereo signals and/or an AC-3 audio signal on audio output leads 432.

The following Table 1 from U.S. Pat. No. 6,381,747 shows an example of the on/off mode bits 422. Mode bits or a bit pattern or control bit(s) or N0[x] (bit or byte) may be for example, derived or provided from at least a portion of a metadata, EPG, and/or IPG signal.

TABLE 1

| | Mode Control Bit Listing Routine On/Off and Mode Selection | | |
|---|---|---|---|
| NO | On/off and mode control; 8 bits | | |
| NO[7] | Reserved | | CPC0[3] |
| NO[6] | Pay-to-tape allowed/prohibited | (Allowed = 1, Default = 0) | CPC0[2] |
| NO[5] | VBI pulses On/Off (VBIP) | (ON = 1) | CPC0[1] |
| NO[4] | End of Field Back Porch Pulses on/off (EOFP) | (ON = 1) | CPC0[0] |
| NO[3] | Colorstripe process On/Off (CSP) | (ON = 1) | CPC1[3] |

TABLE 1-continued

| | Mode Control Bit Listing Routine On/Off and Mode Selection | | |
|---|---|---|---|
| NO | On/off and mode control; 8 bits | | |
| NO[2] | AGC pulse normal (amplitude cycling)/static mode select (AGCY) | (Cycling = Default = 1) | CPC1[2] |
| NO[1] | H-sync amplitude reduction On/Off (HAMP) | (ON = 1) | CPC1[1] |
| NO[0] | V-sync amplitude reduction On/Off (VAMP) | (ON = 1) | CPC1[0] |

It is preferred that the content control or record control waveform/signal (and/or anticopy) process on/off control is achieved by setting all the individual parameter on/off and mode control bits rather than a master on/off control. This requires that the N0 (N-zero) bits in the control bit listing be set as required. Depending on the individual system, this will require the control of 1 to 8 bits.

The delivery of the mode bits (e.g., one byte of data) 422 (see FIG. 17) to the set top box 370 to activate or deactivate the content control or copy protection process may be accomplished in several ways. When selecting a mechanism to control the record or content control (and/or copy protection) technology, a service provider selects one of the following or may develop other methods. One method is for the mode bits to be delivered via the conditional access system 408 via an entitlement control message (ECM). Another method is to include the mode byte 422 in a private data field in the MPEG transport data stream 468. A condition access system may include information from metadata, IPG, and/or EPG, which provides a mode byte such as mode byte 422.

Another method delivers the mode byte 422 in a user defined section of the electronic program guide e.g., EPG 412 and/or IPG interactive programming guide which however is not identified in released documentation as controlling content control or record control (and/or copy protection). This method also requires additional security to keep the memory location of the mode byte 422 from being accessed for unauthorized changes and the setting of a return flag that indicates the actual status of the mode byte when transmitted to the NTSC encoder 396. Another method may be a combination of the conditional access, ECM, EPG, IPG, and/or metadata. The transport of the mode byte in the EPG, IPG, or metadata could be combined with one or more bits within the ECM, IPG, EPG or metadata. For example, to activate the content control or record control (and/or copy protection) technology is a logical (e.g., AND/OR) operation between the ECM bits and/or the EPG or IPG bits. If either is set, the record or content control (and/or copy protection) technology, both (or either) ECM and/or EPG, IPG, or metadata would indicate that deactivation is necessary.

In one embodiment, the content control or record control or copy protection control software (CPCS) and the set top box are capable of applying and reporting content control or record control and/or copy protection usage according to the following conditions. The overall system allows the subscriber's content control or record control and/or copy protection to be turned off at the box as permitted by the PPV program rights holder or system operator.

A) PPV (Pay per View) program rights holder permits viewing only: The pay to record/store to disc/store to memory/tape or store is prohibited (off). An example of "pay to store" would include paying to store one or more video program files in a device such as receiver, player, set top box, etc. Storing may include writing the file onto a magnetic, optical, or electrical medium, which includes disk or solid state memory. In one embodiment all set top boxes output a content control or a record control copy protected waveform only. For example, the copy protection waveform unconditionally appears on the set top box analog video output signal (or terminal). (This is reported to the billing system as a "pay per view" copy protected transaction.)

B) PPV program rights holder permits viewing and recording: The pay to record/tape/store mode (or control) bit is set for pay to record/tape/store (on). Under this option, when the subscriber selected the "pay to record/tape" option, the content control or copy protection process is turned "off" in the STB (set top box) to allow the PPV program to be recorded (via PVR, tape, memory, disc, or the like) for a higher transaction fee than for "viewing only". For example, the content control or record control (and/or copy protection) waveform will not be present on the STB (analog) video output signal. (This is reported to the billing system as a "pay to store" or "pay to record/tape" content control or record control (and/or copy protected) transaction.)

Table 2 below also from U.S. Pat. No. 6,381,747 (incorporated herein by reference in its entirety) shows an example of pay to record, store, or tape control options for video programs generically referred to as "Pay-Per-View" programs. It should be noted that "Pay-To-Tape" may be the equivalent of "Pay-To-Record" or "Pay-To-Store". Table 2 provides a summary of the control options and includes additional information. In Table 2 copy protection may be replaced by content control or record control. Alternatively, the copy protection may include a content control or record control waveform, e.g., such as any embodiment disclosed here pertaining to a weakened color stripe signal, or a weakened color stripe signal and any combination of added pulses or modified voltage levels for a video signal. Any of these signals pertaining to content control or record control (that can be combined with added pulses or modifications in a voltage level of a video signal) may be programmed or enabled or disabled by any portion or bit pattern of a metadata, IPG, and/or EPG signal as described above.

TABLE 2

Pay-Per-View and Pay-To-Tape Control Options for Pay-Per-View Programs

| Program Descriptor of PPV Program | Consumer Request (Pay-Per-View or Pay-To-Tape) | Result |
|---|---|---|
| Copy protection NOT required | N/A | ACP off |
| Copy protection REQUIRED Taping NOT permitted | Pay-Per-View | ACP will be ON. Pay-Per-View transaction cost incurred by consumer. |
| Copy protection REQUIRED Taping NOT permitted | Pay-To-Tape | Requested option not available. ACP will be ON. Pay-Per-View transaction cost incurred by consumer. |
| Copy protection REQUIRED Taping permitted (at higher transaction cost) | Pay-Per-View | ACP will be turned ON by STB control system. Pay-Per-View transaction cost incurred by consumer. |
| Copy protection REQUIRED Taping permitted (at higher transaction cost) | Pay-To-Tape | ACP will be turned OFF by STB control system. Pay-To-Tape transaction cost incurred by consumer. |

This disclosure is illustrative and not limiting. Further modifications will be apparent to those skilled in the art in light of this disclosure and are intended to fall within the scope of the appended claims.

We claim:

1. A method of controlling a digital video recorder, comprising the acts of:
receiving a digital delivery video signal at a tuner or demodulator in the digital video recorder;
extracting metadata from the received signal at the tuner or demodulator;
deriving a control signal from the extracted metadata, wherein the control signal is a weakened color stripe signal and is detectable, but inadequate to prevent an acceptable video tape recording; and
providing the weakened color stripe signal in a video signal output from the digital video recorder, wherein the incorrect color burst includes (a) 2 subcarrier cycles of normal phase angle, followed by 6.5 subcarrier cycles of incorrect phase angle, followed by 7 subcarrier cycles of normal phase angle, ±10%; or (b) 6.5 subcarrier cycles of incorrect phase angle, followed by 8.5 subcarrier cycles of normal phase angle, ±10%.

2. A method of providing a content control indication in a video signal output by a video receiver apparatus, comprising the acts of:
receiving a digital video signal or video file from an external source at a port in the video receiver apparatus;
receiving a command at the video receiver apparatus;
modifying the received video signal or video file at the video receiver apparatus, in response to the received command, to include a weakened color stripe signal in selected scan lines of the video signal, the weakened color stripe signal having an incorrect color burst in a horizontal blanking interval of the selected scan lines, wherein the incorrect color burst is detectable but inadequate to prevent an acceptable video tape recording of the modified video signal, whereby the weakened color stripe signal is an indication of content control;
converting the modified video signal or video file by a digital to analog converter to an analog video signal; and
outputting the analog video signal from the video receiver apparatus, wherein the incorrect color burst includes (a) 2 subcarrier cycles of normal phase angle, followed by 6.5 subcarrier cycles of incorrect phase angle, followed by 7 subcarrier cycles of normal phase angle, ±10%; or (b) 6.5 subcarrier cycles of incorrect phase angle, followed by 8.5 subcarrier cycles of normal phase angle, ±10%.

3. The method of claim 2, wherein the video receiver apparatus further receives the video signal or video file from one of an optical disc, a hard disc, a magnetic tape, or a solid state memory device.

4. The method of claim 2, wherein the output analog video signal conforms to an NTSC, PAL, or SECAM television standard.

5. The method of claim 2, wherein the incorrect color burst includes more subcarrier cycles of correct phase angle than subcarrier cycles of incorrect phase angle.

6. The method of claim 2, wherein the incorrect color burst includes a plurality of subcarrier cycles of incorrect phase angle that are attenuated.

7. The method of claim 2, wherein a length of the incorrect color burst is extended beyond that of a normal color burst.

8. The method of claim 2, further comprising the acts of:
providing a copy protection signal; and
inserting the copy protection signal into the output analog video signal.

9. The method of claim 2, further comprising detecting the command in the received digital video signal or video file.

10. The method of claim 2, wherein a shift from normal of a phase angle of the subcarrier cycles of incorrect phase angle is at least 20°.

11. The method of claim 2, wherein the weakened color stripe signal encodes one of a plurality of content control states.

12. The method of claim 2, wherein the command is received from a digital video storage medium.

13. The method of claim 2, wherein the command is received from a source external to the apparatus via a digital delivery network.

14. The method of claim 2, wherein the command is metadata.

15. A video receiver apparatus which provides a content control indication in a video output signal, comprising:
- an input port adapted to receive a digital video signal or video file from an external source;
- a signal generator coupled to the input port and which generates, for selected scan lines of the video signal or video file, a weakened color stripe signal having an incorrect color burst for a horizontal blanking interval of the selected scan lines, wherein the incorrect color burst is detectable, but inadequate to prevent acceptable video tape recording of the modified video signal, and wherein the weakened color stripe signal is combined with the digital video signal or video file;
- a digital to analog converter coupled to receive the digital video signal or video file and the weakened color stripe signal; and
- an output port coupled to the digital to analog converter for outputting an analog video signal, whereby the weakened color stripe signal in the output analog video signal is an indication of content control, wherein the incorrect color burst includes (a) 2 subcarrier cycles of normal phase angle, followed by 6.5 subcarrier cycles of incorrect phase angle, followed by 7 subcarrier cycles of normal phase angle, ±10%; or (b) 6.5 subcarrier cycles of incorrect phase angle, followed by 8.5 subcarrier cycles of normal phase angle, ±10%.

16. The apparatus of claim 15, further comprising at least one of an optical disc drive, a hard disc drive, a magnetic tape drive, or a solid state memory device and which is coupled to the input port.

17. The apparatus of claim 15, wherein the output analog video signal conforms to an NTSC, PAL, or SECAM television standard.

18. The apparatus of claim 15, wherein the incorrect color burst includes more subcarrier cycles of correct phase angle than subcarrier cycles of incorrect phase angle.

19. The apparatus of claim 15, wherein the incorrect color burst includes a plurality of subcarrier cycles of incorrect phase angle that are attenuated.

20. The apparatus of claim 15, wherein a length of the incorrect color burst is extended beyond that of a normal color burst.

21. The apparatus of claim 15, wherein the signal generator further provides a copy protection signal.

22. The apparatus of claim 15, further comprising:
- a control data reader or detector coupled to the signal generator and the input port and which detects a command in the received digital video signal or video file.

23. The apparatus of claim 15, wherein a shift from normal of a phase angle of subcarrier cycles of incorrect phase angle is at least 20°.

24. The apparatus of claim 15, wherein the weakened color stripe signal encodes one of a plurality of content control states.

25. The apparatus of claim 15, wherein the signal generator is programmable from an external source via a digital delivery network.

26. The apparatus of claim 15, wherein the signal generator is programmable by a metadata or by a program guide signal.

* * * * *